(12) United States Patent
Subramanian et al.

(10) Patent No.: US 12,069,026 B2
(45) Date of Patent: Aug. 20, 2024

(54) POWER LINE COMMUNICATION (PLC) DENIAL OF SERVICE ATTACK

(71) Applicant: QUALCOMM Incorporated, San Diego, CA (US)

(72) Inventors: Ramanathan Subramanian, Chennai (IN); Jain Roy Ambi, Chennai (IN); Srinivas Katar, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 17/808,105

(22) Filed: Jun. 21, 2022

(65) Prior Publication Data

US 2023/0412212 A1 Dec. 21, 2023

(51) Int. Cl.
*H04L 9/40* (2022.01)
(52) U.S. Cl.
CPC .......... *H04L 63/0227* (2013.01); *H04L 63/12* (2013.01); *H04L 63/1458* (2013.01)
(58) Field of Classification Search
CPC .. H04L 63/1458; H04L 63/12; H04L 63/0227
See application file for complete search history.

(56) References Cited

U.S. PATENT DOCUMENTS

| | | | | |
|---|---|---|---|---|
| 8,881,281 B1* | 11/2014 | Mitchell | ................. | H04L 63/30 709/224 |
| 9,141,789 B1* | 9/2015 | Gerlach | .............. | H04L 63/1458 |
| 9,413,783 B1* | 8/2016 | Keogh | ................ | H04L 63/1458 |
| 11,438,371 B2* | 9/2022 | Nainar | ................ | H04L 63/1458 |
| 2009/0293123 A1* | 11/2009 | Jackson | .............. | H04L 63/1458 726/23 |
| 2013/0094552 A1 | 4/2013 | Vedantham et al. | | |
| 2013/0343404 A1 | 12/2013 | Vijayasankar et al. | | |
| 2017/0257348 A1* | 9/2017 | Jain | ..................... | H04L 63/0254 |

(Continued)

OTHER PUBLICATIONS

Bicakci, Kemal, and Bulent Tavli. "Denial-of-Service attacks and countermeasures in IEEE 802.11 wireless networks." Computer Standards & Interfaces 31.5 (2009): 931-941. (Year: 2009).*

(Continued)

*Primary Examiner* — Syed A Zaidi
(74) *Attorney, Agent, or Firm* — Holland & Hart LLP/Qualcomm

(57) ABSTRACT

This disclosure provides systems, methods and apparatus, including computer programs encoded on computer storage media, to mitigate a denial of service attack to a power line communication (PLC) network. A first node of the PLC network may activate a countermeasure that enables the PLC network (including the first node and a second node) to continue to communicate when one or more transmissions associated with a denial of service attack are injected onto the communication medium. This disclosure includes several techniques to detect a denial of service attack and several countermeasures that may be implemented. For example, a countermeasure may include the use of a custom preamble or a custom priority resolution symbol that is specific to the PLC network. The first node and the second node may disregard transmissions that do not conform to the custom preamble or custom priority resolution symbol.

37 Claims, 18 Drawing Sheets

(56) References Cited

U.S. PATENT DOCUMENTS

2020/0410092 A1\* 12/2020 Mishra ................. G06F 21/552

OTHER PUBLICATIONS

NPL Search Terms (Year: 2024).\*
Kohler, et al., "Brokenwire Attack on CCS Charging for EVs", Feb. 2022, 7 pages.
Kohler, et al., "Brokenwire: Wireless Disruption of CCS Electric Vehicle Charging", Feb. 2022, 15 pages.
Toledo, "Robust Detection of MAC Layer Denial-of-Service Attacks in CSMA/CA Wireless Networks", Sep. 2008, pp. 347-358.
Zhang, et al., "Preamble Injection and Spoofing Attacks in Wi-Fi Networks", 2021, 6 pages.
International Search Report and Written Opinion—PCT/US2023/020996—ISA/EPO—Aug. 22, 2023 (2204435WO).

\* cited by examiner

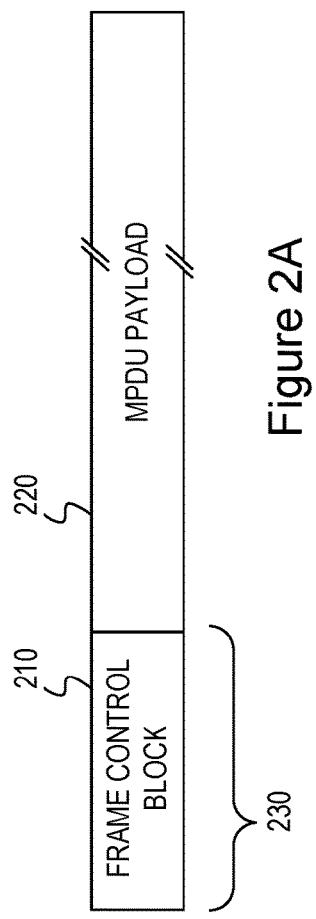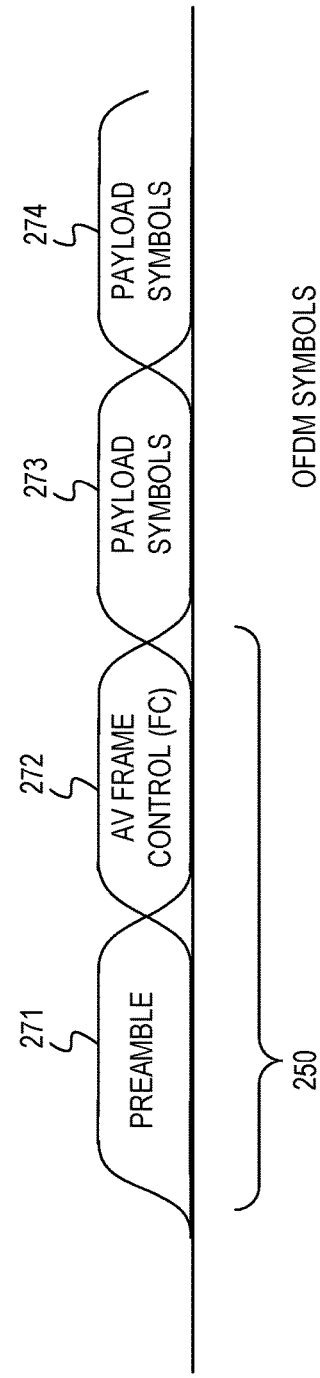

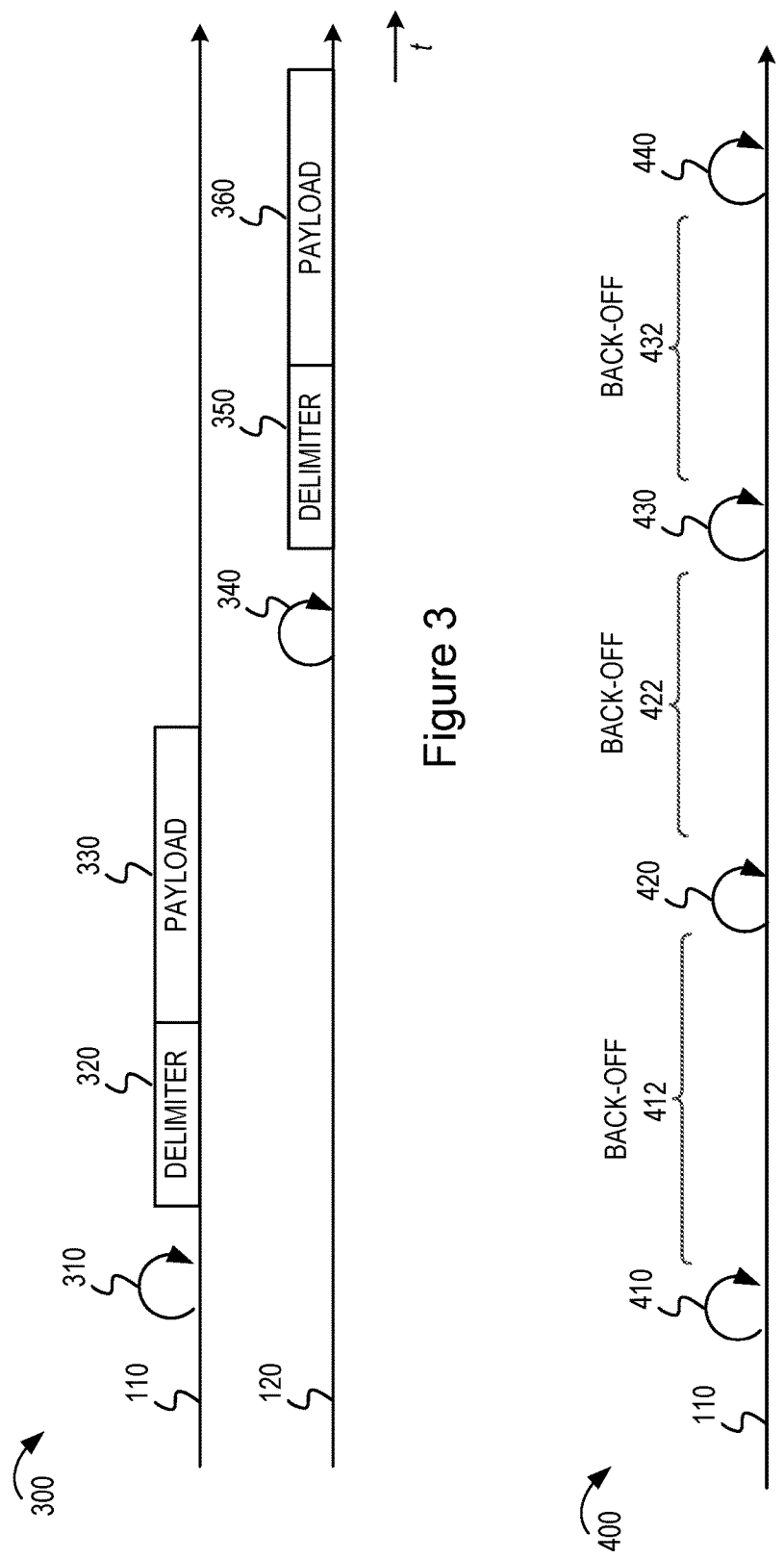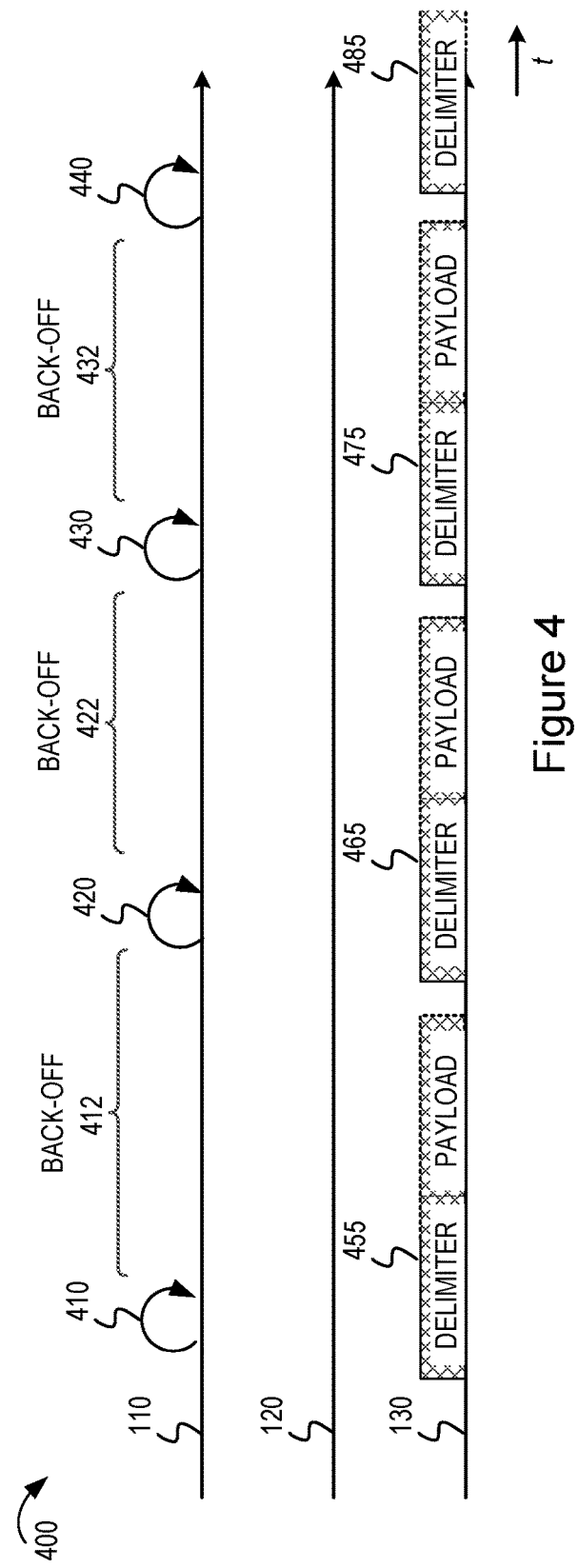

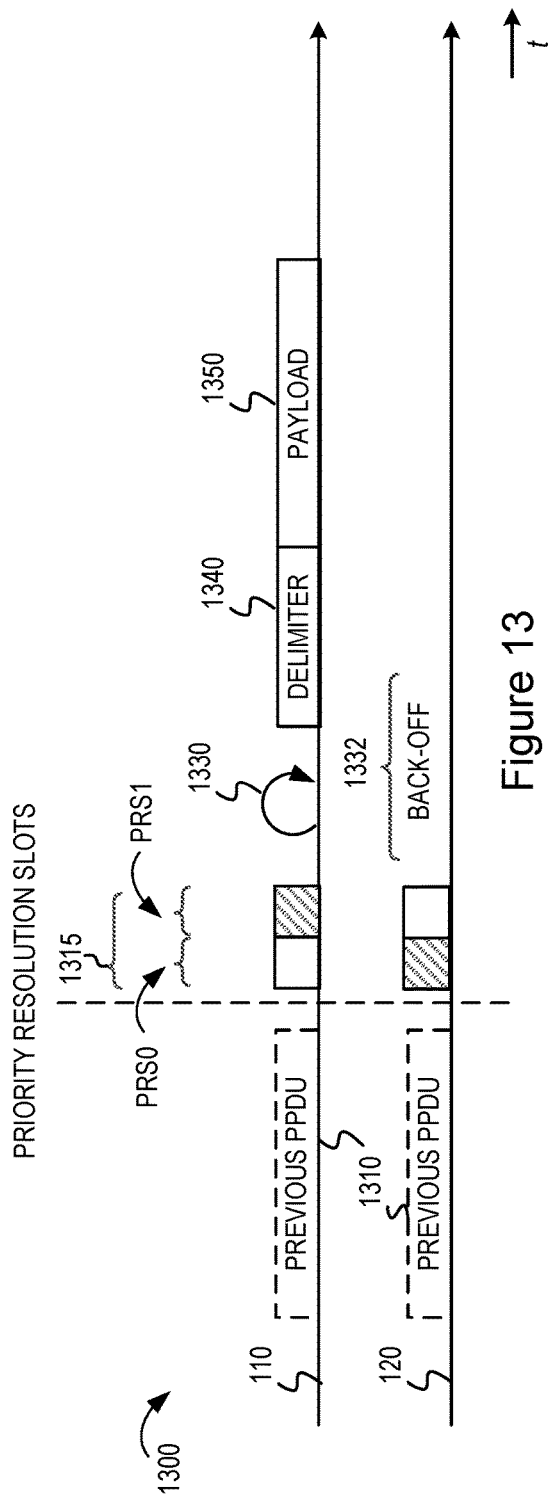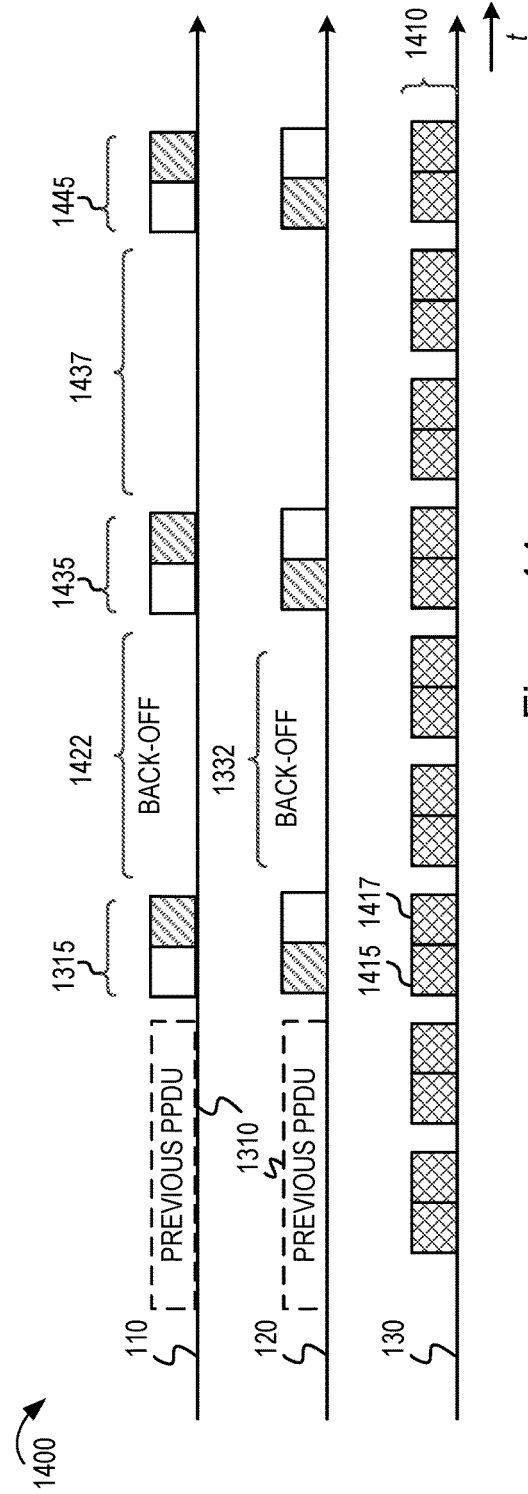

2200

| 384-IFFT Carrier Number | Frequency (MHz) | Phase Angle Number |
|---|---|---|
| 10 | 1.953125 | 15 |
| 11 | 2.148438 | 1 |
| 12 | 2.343750 | 0 |
| 13 | 2.539063 | 11 |
| 14 | 2.734375 | 12 |
| 15 | 2.929688 | 8 |
| ... | ... | ... |
| 153 | 9.882810 | 9 |

2210

| 384-IFFT Carrier Number | Frequency (MHz) | Phase Angle Number |
|---|---|---|
| 10 | 1.943210 | 15 |
| 11 | 2.148438 | 1 |
| 12 | 2.343750 | 2 |
| 13 | 2.539063 | 14 |
| 14 | 2.833410 | 12 |
| 15 | 2.929688 | 8 |
| ... | ... | ... |
| 153 | 9.882810 | 9 |

Figure 22

POWER LINE COMMUNICATION (PLC) DENIAL OF SERVICE ATTACK

TECHNICAL FIELD

Aspects of the present disclosure generally relate to power line communication (PLC) and mitigation of a denial of service attack to a PLC network.

DESCRIPTION OF THE RELATED TECHNOLOGY

A communication system typically includes two or more nodes configured to communicate via a communication medium. A power line communication (PLC) network is an example communication system in which the communication medium includes a wired communication medium. PLC systems are well suited for some applications, such as when power delivery and communication are desirably supported by a wired communication medium. For example, a charging station (sometimes referred to as an electric vehicle supply equipment, or EVSE) may utilize a PLC network for power transfer as well as communication with an electric vehicle (EV). A PLC standard specification may describe the messages, protocols and timing of communications in a PLC network. Recently, there have been denial of service attacks associated with exploiting documented features of the PLC standard specification. In some cases, the denial of service attack may be designed to disrupt PLC network communication between an EVSE and EV. Absent techniques to mitigate the denial of service attack, the denial of service attack may prevent EV charging or cause dangerous power conditions.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of a first node in a power line communication (PLC) network. The method may include establishing a PLC network over a communication medium. The PLC network may include at least the first node and a second node. The method may include negotiating a custom preamble for the PLC network. The method may include activating a countermeasure in the PLC network in association with a denial of service attack associated with one or more transmissions injected onto the communication medium to disrupt PLC network communications. Activating the countermeasure may include utilizing the custom preamble for PLC network communications between the first node and the second node.

In some implementations, the method may include processing at least a first transmission of the one or more transmissions in association with a PLC frame format of a PLC standard specification. The method may include activating the countermeasure when the first transmission includes a first portion that conforms to the PLC standard specification and a second portion that contradicts the PLC standard specification.

In some implementations, the PLC network may be associated with a PLC standard specification that defines operations of the PLC network. The PLC standard specification may include a standard carrier-sense multiple access (CSMA) in which the first node or the second node refrain from communicating via the communication medium during a backoff period after observing a communication having a standard preamble. The method may include utilizing a custom CSMA mechanism associated with a modification of the standard CSMA mechanism, where the custom CSMA mechanism includes monitoring for the custom preamble rather than the standard preamble.

In some implementations, activating the countermeasure includes communicating a preamble change indication to a central node of the PLC network to cause the central node to instruct one or more other nodes of one or more respective PLC networks to utilize use the custom preamble.

Another innovative aspect of the subject matter described in this disclosure can be implemented in a first node for use in a PLC network. The first node may include a communication unit configured to establish a PLC network over a communication medium, the PLC network including at least the first node and a second node. The first node may include a processor communicatively coupled to the communication unit. The processor may be configured to negotiate a custom preamble for the PLC network and activate a countermeasure in the PLC network in association with a denial of service attack associated with one or more transmissions injected onto the communication medium to disrupt PLC network communications. The communication unit may be configured to utilize the custom preamble for PLC network communications between the first node and the second node when the countermeasure is activated.

Another innovative aspect of the subject matter described in this disclosure can be implemented in a method of a first node in a PLC network. The method may include establishing a PLC network over a communication medium, the PLC network including at least the first node and a second node. The method may include negotiating a custom priority resolution symbol for the PLC network. The method may include activating a countermeasure in the PLC network in association with a denial of service attack associated with one or more transmissions injected onto the communication medium to disrupt PLC network communications. Activating the countermeasure may include utilizing the custom priority resolution symbol for priority contention in the PLC network.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 2A shows an example media access control (MAC) protocol data unit (MPDU) frame format.

FIG. 2B shows an example physical layer (PHY) protocol data unit (PPDU) frame format.

FIG. 3 shows an example carrier sense multiple access (CSMA) mechanism.

FIG. 4 shows an example denial of service attack that exploits the CSMA mechanism.

FIG. 13 shows an example priority contention mechanism.

FIG. 14 shows an example denial of service attack that exploits the priority contention mechanism.

FIG. 22 shows a partial frequency/phase configuration of an example custom preamble in comparison to the partial frequency/phase configuration of a standard preamble.

Like reference numbers and designations in the various drawings indicate like elements.

DETAILED DESCRIPTION

Figure 1:
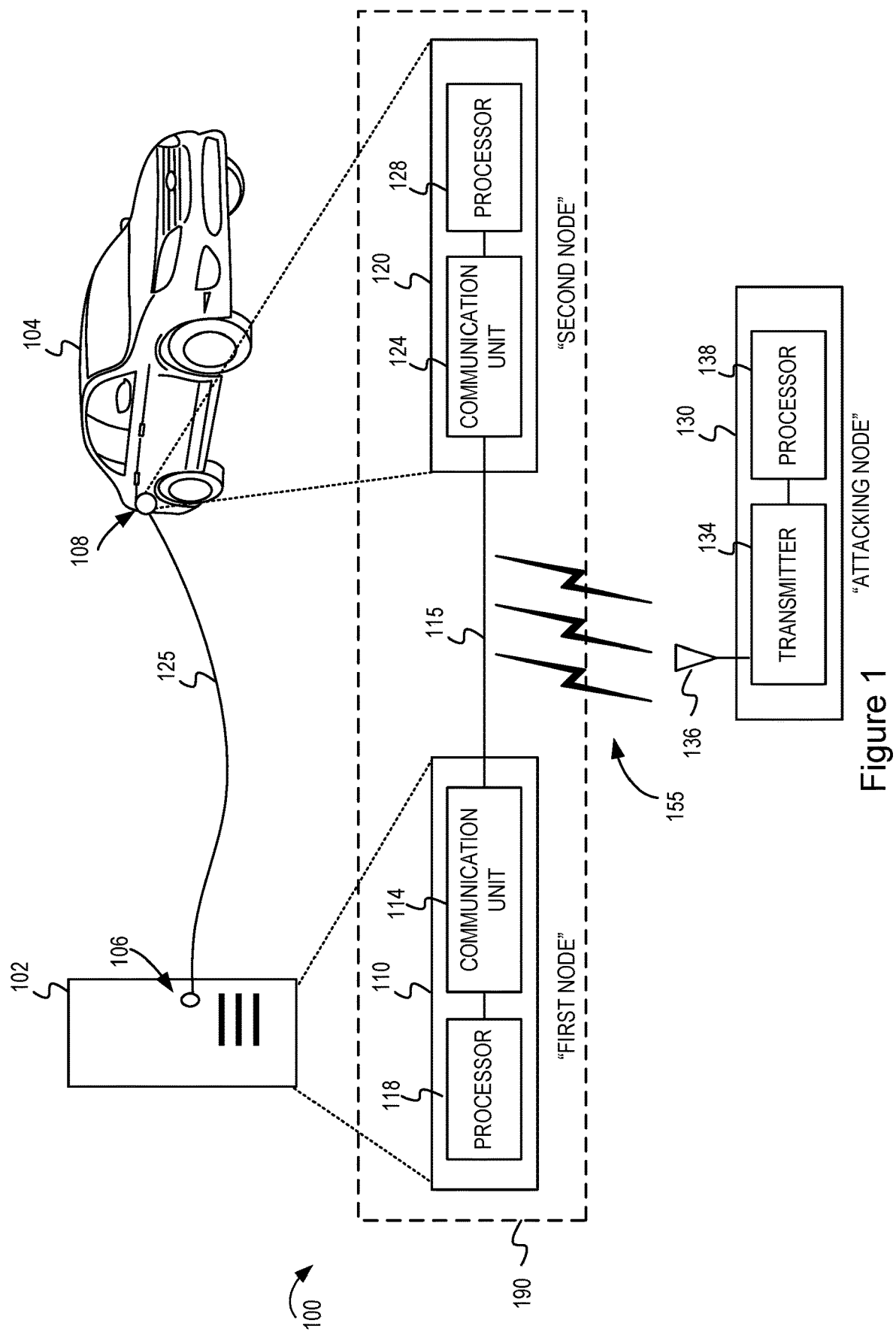
FIG. 1 depicts an example power line communication (PLC) system and an example denial of service attack.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on power line communication (PLC) standards. Examples of such PLC standards may include HomePlug® Green Physical layer (PHY) specification, International Organization of Standards (ISO) 15118, Society of Automotive Engineering (SAE) J1772, International Electrotechnical Commission (IEC) 61851-1, and the German Institute for Standardization (DIN) 70121, among other examples. However, the described implementations may be implemented in any device, system or network that is capable of transmitting and receiving radio frequency signals according to any of the wired or wireless communication standards, including any of the Institute of Electrical and Electronics Engineers (IEEE) wired or wireless standards (such as IEEE 802.3 or IEEE 802.11), IEEE 1901, the $3^{rd}$ Generation Partnership Project (3GPP) wireless standards, and the Bluetooth® standard, among other examples.

A power line communication (PLC) network may include multiple nodes that communicate via a communication medium, where the communication medium includes a power line. As an example, a first node may be an electric vehicle (EV) and a second node may be an electric vehicle supply equipment (EVSE). To support vehicle charging, the EV and EVSE may be coupled by a cable and connectors. At one end of the cable, a first connector may connect to a vehicle inlet of the EV. At the other end of the cable, a second connector (sometimes referred to as a plug) may connect to a socket outlet of the EVSE. The cable may be used to deliver power from the EVSE to the EV. The EVSE and EV may form a PLC network via the communication medium in the cable. The PLC network may operate according to a set of protocols and messages to create a PLC network and manage communications. The communications may be used to exchange information about power transfer, billing, or charging status, among other examples.

PLC is well suited to support communication between an EV and an EVSE. However, there exists a potential for the wired communication medium to act as an antenna such that interference and external signals may be injected onto the communication medium. PLC networks implement noise canceling, security protocols, and robust encoding to overcome noise and benign signals that appear on the communication medium. However, legacy techniques may be inadequate to prevent or mitigate a denial of service attack in which transmissions are injected onto the communication medium to disrupt PLC network communications. For example, the transmissions may be formatted to mimic a PLC network communication. The transmissions may exploit a carrier-sense multiple access (CSMA) mechanism or a priority contention mechanism of the PLC network. Traditional techniques to protect the communication medium from such attacks may be inadequate or unnecessarily expensive.

This disclosure provides systems, methods, and apparatuses to mitigate a denial of service attack in a power line communication (PLC) network. A first node of the PLC network may activate a countermeasure that enables the PLC network (including the first node and a second node) to continue to communicate when one or more transmissions associated with a denial of service attack are injected onto the communication medium. This disclosure includes several techniques to detect or identify a denial of service attack and several countermeasures that may be implemented. For example, a countermeasure may include the use of a custom preamble or a custom priority resolution symbol that is specific to the PLC network. The custom preamble or custom priority resolution symbol may be known to the first node and the second node of the PLC network but not known to an attacking node. The first node and the second node may disregard transmissions that do not conform to the custom preamble or custom priority resolution symbol. In several examples of this disclosure, the first node may be an EV or EVSE and the second node may be the other one of the EV or EVSE. Additionally, the first node or the second node may be a central node that manages multiple PLC networks associated with corresponding EVSE-EV associations.

In some aspects, a denial of service attack may include one or more transmissions that are at least partially formatted to conform to a PLC standard specification. For example, a transmission may include a first portion (such as part of a standard preamble) that conforms to the PLC standard specification and a second portion that contradicts the PLC standard specification. A node may process the one or more transmission according to a PLC frame format to identify failures that indicate the transmission are associated with a denial of service attack. The failures may include an invalid or omitted part of transmission relative to the PLC frame format. For example, the transmission may include a preamble but omit a frame control (FC) portion or a payload portion. In another example, the transmission may include an invalid value in the FC portion, such as an invalid Beacon Time Stamp, an invalid media access control (MAC) Frame Stream state, or an invalid payload portion, among other examples. In some implementations, a node may identify or detect a denial of service attack when the communication medium has had a history of CSMA busy conditions, priority contention failures, or abnormal congestion, among other examples.

Some denial of service attacks are based on repetitive preamble signal injection. For example, an attacking node may repetitively inject a standard preamble onto the communication medium to make the communication medium appear busy. Because PLC networks use CSMA to check the communication medium for an idle condition before communicating, the injected preambles may cause the nodes to backoff and refrain from communicating via the communication medium. In some aspects, the nodes may activate a custom preamble that is different from the standard preamble. Thereafter, the nodes may disregard the standard preamble for purposes of a CSMA clear channel assessment and instead use the custom preamble when performing the CSMA clear channel assessment.

In some aspects, a countermeasure may include disregarding or filtering one or more transmissions associated with a denial of service attack. For example, a node may generate correlation data associated with the one or more transmission of the denial of service attack. The correlation data describe amplitude, phase, signal strength, or any combination thereof, of at least part of the one or more transmissions. The node may adjust a physical (PHY) layer of its communication unit to disregard subsequent transmissions that match the correlation data. In some implementations, the node may adjust the PHY layer to filter out the one or more transmission of the denial of service attack such as it would filter out noise.

In some aspects, a node may activate a countermeasure by communicating a preamble change indication. The preamble change indication may instruct one or more other nodes to use the custom preamble for PLC network communications. In some implementations, a node may communicate the preamble change indication in a management message entry (MME) frame or an application layer protocol message. Alternatively, or additionally, the node may communicate a pulse width modulation (PWM) signal having a particular duty cycle or sequence associated with the preamble change indication. In some implementations, a node may communicate the preamble change indication to a central node to cause the central node to instruct one or more other nodes of one or more respective PLC networks to utilize use the custom preamble.

In some aspects, a node of the PLC network may activate a countermeasure to mitigate a denial of service attack based on priority contention. Typically, nodes of a PLC network will use a priority contention mechanism in which the nodes signal their priority during priority resolution slots (PRSs). Traditionally, the priority contention mechanism uses standard priority resolution symbols that are based on a predetermined waveform transmitted during PRSs. An attacking node may attempt to exploit the priority contention mechanism by injecting transmissions that use the standard priority resolution symbol to indicate it has the highest priority. The legitimate nodes of the PLC network may defer from contending for access to the communication medium if they do not also have the highest priority. When the denial of service attack is present, the legitimate nodes may change the priority contention mechanism for the PLC network to use a custom priority resolution symbol (rather than the standard priority resolution symbol).

Particular implementations of the subject matter described in this disclosure can be implemented to realize one or more of the following potential advantages. Nodes of a PLC network may mitigate denial of service attacks that would otherwise disrupt PLC network operations. In the case of EV charging, the PLC network between an EV and EVSE may remain active so that EV charging can continue without disrupting charging or creating potentially dangerous power conditions in the charging cable. Advantageously, the techniques of this disclosure may be implemented with little or no changes to cables, connectors, or other expensive components associated with modifying EV or EVSE hardware to mitigate denial of service attacks. Some aspects of this disclosure may facilitate rapid adoption of charging stations by leveraging denial of service countermeasures with existing infrastructure.

FIG. 1 depicts an example power line communication (PLC) system 100 and an example denial of service attack. The example PLC system 100 includes a first node 110 and a second node 120. For example, the first node 110 may be associated with an EVSE 102. The second node 120 may be associated with an EV 104. The EVSE 102 may include a socket outlet 106. The EV 104 may include a vehicle inlet 108. A cable 125 may include a plug on one end (not shown) configured to connect to the socket outlet 106. The cable 125 also may include a connector on the other end (not shown) configured to connect to the vehicle inlet 108. The types of connectors used for the cable 125 may vary depending on a geographic/regional standard for a charging station, the manufacturer of the EV 104, or charging station operator, among other examples. The cable 125 may include a communication medium 115 as well as other conductors for power transfer from the EVSE 102 to the EV 104. When the EVSE 102 is connected to the EV 104 via the cable 125, the first node 110 of the EVSE 102 may use the communication medium 115 for powerline communication with the second node 120 of the EV 104. Together, the first node 110, the communication medium 115, and the second node 120 may be referred to as a PLC network 190.

The first node 110 may include a processor 118 and a communication unit 114. The communication unit 114. The communication unit 114 may include a transceiver (or separate transmitter and receiver components) for transmitting and receiving communications via the communications medium 115. The processor 118 may control the communication unit 114 and manage settings, such a PLC frame processing, a CSMA mechanism, a priority contention mechanism, or other configurations used by the communication unit 114 to communicate with a corresponding communication unit 124 of the second node 120. Similar to the first node 110, the second node 120 may include a communication unit 124 and a processor 128.

The PLC network 190 may operate according to a PLC standard specification. An example PLC standard specification may be the HomePlug® Green PHY Specification. The PLC standard specification may specify standard operations of the PLC network 190, including format, content, and protocol of messages between nodes of the PLC network. The PLC standard specification also may specify a contention procedure, such as CSMA with collision avoidance (CSMA/CA), CSMA with collision detection (CSMA/CD), or a priority contention mechanism, among other examples. In some implementations, the PLC standard specification specifies standard preamble symbols, standard priority resolution symbols, or other specified sequences.

The nodes (such as first node 110 and second node 120) of the PLC network 190 communicate by transmitting or receiving signals via the communication medium 115. While the PLC standard specification may define protocols to secure communications between the nodes of the PLC network 190. However, a denial of service attack may be designed to interfere with or otherwise disrupt the ability of the nodes to utilize the communication medium 115. For example, a denial of service attack may be designed to cause the communication medium 115 to appear congested with PLC network communications in an attempt to prevent the first node 110 or the second node 120 from accessing the communication medium 115 during a period of time when the denial of service attack is active. FIG. 1 illustrates an example denial of service attack in which an attacking node 130 transmits one or more transmissions 155 that are injected onto the communication medium 115. Because the communication medium 115 is a conductive material, it can act as an antenna capable of receiving radio frequency transmissions, such as the one or more transmissions 155 from the attacking node 130. It should be noted that the techniques of this disclosure are not limited to attacks that utilize radio frequency transmissions, but also mitigate from denial of service attacks from an attacking node (not shown) having a wired connection to a power line (not shown) of the EV SE 102.

In the example shown in FIG. 1, the attacking node 130 may include an antenna 136, a transmitter 134 and a processor 138. The processor 138 may implement at least a portion of the PLC standard specification, such that the one or more transmissions 155 may mimic PLC network communications. For example, the one or more transmissions 155 may include at least a first part of a PLC frame format (such as at least part of a standard preamble or frame control (FC) field). In some implementations, the PLC frame format may be a physical layer protocol data unit (PPDU) frame format. Alternatively, or additionally, the one or more transmissions 155 may include an invalid media access control (MAC) protocol data unit (MDPU) conveyed within an otherwise valid PPDU. According to a standard CSMA mechanism of the PLC network 190, first node 110 or the second node 120 (or both) may refrain from communicating via the communication medium 115 for a backoff period after observing a communication having at least the first part of the PLC frame format. Thus, the attacking node 130 may exploit the standard CSMA mechanism by causing the first node 110 or the second node 120 (or both) to interpret the one or more transmissions 155 as PLC network communications. Absent the techniques of this disclosure, the attacking node 130 may continually inject the one or more transmissions 155 to prevent the first node 110 or the second node (or both) from gaining access to the communication medium 115.

FIG. 2A shows an example MPDU frame format 201. The example MPDU frame format 201 may be one of various types of MPDU frame formats specified by a standard PLC specification. The example MPDU frame format 201 may include a frame control block 210 and an MPDU payload 220. The MPDU payload 220 may convey transport layer or application layer data from the EVSE to the EV, or vice versa. An MPDU also may be referred to as a packet. The frame control block 210 includes frame control information 230. In some implementations, the frame control information 230 may be partially incorporated into a variant field of frame control (FC) field (not shown) of a PPDU (such as shown in FIG. 2B). The MPDU payload 220 may include a MAC header (not shown) and MAC service data unit (MSDU, not shown). The MPDU payload 220 also may be referred to as a packet.

FIG. 2B shows an example PPDU frame format 202. The example PPDU frame format 202 may be one of various types of PPDU frame formats specified by a standard PLC specification. The PPDU (sometimes also referred to as a frame) may be communicated via the communication medium using orthogonal frequency division multiplexing (OFDM) symbols. OFDM symbols may be referred to as symbols or waveform in this disclosure. The example PPDU frame format 202 may include one or more preamble symbols (such as preamble 271), one or more frame control symbols (such as Audio Visual (AV) frame control (FC) 272), and one or more payload symbols (such as payload symbols 273 and 274). The AF FC 272 may include "audio visual" due to the historical development to the PLC standard specification and for backward compatibility, but the PLC standard specification is not limited to audio or visual information. For EV charging applications, the type of information communicated by the PPDU (and the MPDU it carries) may be application data unrelated to audio or visual applications. For brevity, the AV FC 272 also may be referred to as a frame control (FC) portion of the PPDU. The FC portion may include one symbol (as shown in FIG. 2B) or may span multiple symbols in other PLC frame formats defined by the PLC standard specification. Similarly, the preamble 271 may include one symbol (as shown in FIG. 2B) or may span multiple symbols in other PLC frame formats defined by the PLC standard specification.

The PPDU ("frame") may convey an MPDU ("packet"). In some implementations, part of the MPDU frame control information may be conveyed via a variant field (not shown) of the AV FC 272. Absent the techniques of this disclosure, the preamble 271 may include standard preamble symbols defined by the PLC standard specification. In such instances, the preamble 271 may be referred to as a standard preamble. The preamble 271 and the AV FC 272 may be collectively referred to as a delimiter 250. The AV FC 272 may include one or more fields (not shown), such as a contention control (CC) field, a delimiter type (DT) field, a variant field (VF) based on the delimiter type, and a frame control check sequence (FCCS). For example, the DT field may indicate whether the PPDU is a beacon, a start of frame (SOF), a selective acknowledgement (SAC), a request to send (RTS)/clear to send (CTS), a sound frame. reverse start of frame (RSOF), among other examples. The format of the variant field (not shown) may differ based on the delimiter type.

FIG. 3 shows an example CSMA mechanism 300. A PLC network (such as PLC network 190 of FIG. 1) may utilize a CSMA mechanism to determine whether a communication medium is idle or busy. Under CSMA, a transmitting node uses a carrier-sense mechanism to determine whether another transmission is in progress before initiating a transmission. That is, a node tries to detect the presence of a carrier signal from another node before attempting to transmit. If a carrier is sensed, the node waits for the transmission in progress to end before initiating its own transmission. Using CSMA, multiple nodes may, in turn, send and receive on the same medium. Transmissions by one node are generally received by all other nodes connected to the communication medium. When the communication medium is busy, the node may refrain from communicating and wait for a backoff period before checking the communication medium again.

FIG. 3 shows the example CSMA mechanism 300 utilized by a first node 110 and a second node 120 of a PLC network. For clarity, the use of the communication medium is shown as separate timelines for the first node 110 and the second node 120; however, it should be understood that they are utilizing the same communication medium. Beginning on the left side of FIG. 3, the first node 110 may have data to communicate to the second node 120. At block 310, the first node 110 may sense the communication medium using the CSMA mechanism. For example, the first node 110 may observe the communication medium for any signals that match a standard preamble. In some implementations, the process of observing the communication medium may be referred to as a channel assessment (sometimes also referred to as clear channel assessment (CCA), energy detection, or carrier sense, among other examples). The result of the channel assessment may be an idle condition or a busy condition. For example, an idle condition may be the result when the first node 110 does not detect a PLC network communication on the communication medium. The busy condition may be the result when the first node detects a PLC network communication. In the busy condition (not shown in FIG. 3), the first node 110 may refrain from communicating via the communication medium and wait for a backoff period before performing a subsequent channel assessment.

In the example shown in FIG. 3, the first node 110 may determine at block 310 that the communication medium is idle (meaning the first node 110 did not detect a PLC network communication on the communication medium). The first node 110 may proceed with communicating a PPDU (including the delimiter 320 and payload 330) on the communication medium. At some point, the second node 120 may have data to communicate via the communication medium. At block 340, the second node 120 may perform a channel assessment and determine that the communication medium is idle and may proceed with communicating its PPDU (including the delimiter 350 and payload 360).

FIG. 4 shows an example denial of service attack 400 that exploits the CSMA mechanism. As with FIG. 3, the communication medium has been illustrated with timelines for separate nodes that share the same communication medium. In FIG. 4, a first node 110 and a second node 120 may be part of a PLC network utilizing the communication medium. A third node (referred to as attacking node 130) may inject one or more transmissions 455, 465, 475, and 485 onto the communication medium to cause a denial of service attack. Each of the transmissions 455, 465, 475, and 485 may be formatted to include at least part of a PLC frame format. For example, the transmissions 455, 465, 475, and 485 may include part of a delimiter. In some cases, the transmissions 455, 465, 475, and 485 may only include a standard preamble (such as a standard preamble symbol as described with reference to FIG. 2B). In some cases, the transmissions 455, 465, 475, and 485 may omit or include other parts of the delimiter (such as an AV FC symbol as described with reference to FIG. 2B). The transmissions 455, 465, 475, and 485 may omit or include payload symbols. In the example denial of service attack, the transmissions 455, 465, 475, and 485 include the standard preamble portion of the delimiter.

When the first node 110 performs a CSMA assessment 410, absent the techniques of this disclosure, the first node 110 may determine the communication medium is busy with a PLC network communication (based on the presence of transmission 455). The first node 110 may refrain from access the communication medium for a backoff period 412. After the backoff period 412, the first node 110 may again observe the communication medium for a CSMA assessment 420 and again determine the communication medium is busy (this time based on the presence of transmission 465). The attacking node 130 may continuously inject the transmissions 455, 465, 475, and 487 onto the communication medium so that each time the first node 110 performs a CSMA assessment 410, 420, 430, and 440, the first node may determine the communication medium is busy and refrain from accessing the communication medium for respective backoff periods 412, 422, 432, and so on. Although FIG. 4 shows the first node 110 attempting to access the communication medium, the second node 120 also may have data to transmit and may similarly be prevented from accessing the communication medium based on CSMA assessments (not shown) that it performs.

In the scenario where the first node 110 and the second node 120 are an EVSE and EV, respectively, the inability to communicate via the communication medium may disrupt a power transfer session. For example, a node (such as the EVSE or the EV) may be configured to end the power transfer session after timeout period when it does not receive a communication (such as a charging status, power control message, or keepalive communication) from the other node (the EV or the EVSE). The denial of service attack may exploit the CSMA mechanism of the PLC network to prevent the EVSE and EV from communicating for a duration exceeding the timeout period.

In accordance with aspects of this disclosure, the first node 110, the second node 120, a central node (not shown), or any combination thereof, may activate a countermeasure in the PLC network to mitigate denial of service attacks such as the example shown in FIG. 4. In some implementations, the countermeasure may be activated in association with the denial of service attack. For example, the countermeasure may be activated as part of establishing the PLC network such that the denial of service attack is rendered inoperable. Alternatively, or additionally, the countermeasure may be activated based on a detection of the denial of service attack. This disclosure includes several example indicia of a denial of service attack. A node of a PLC network may process at least part of the one or more transmissions (such as transmissions 455, 465, 475, and 485) to obtain an indication that the one or more transmissions are associated with the denial of service attack.

Figure 5:
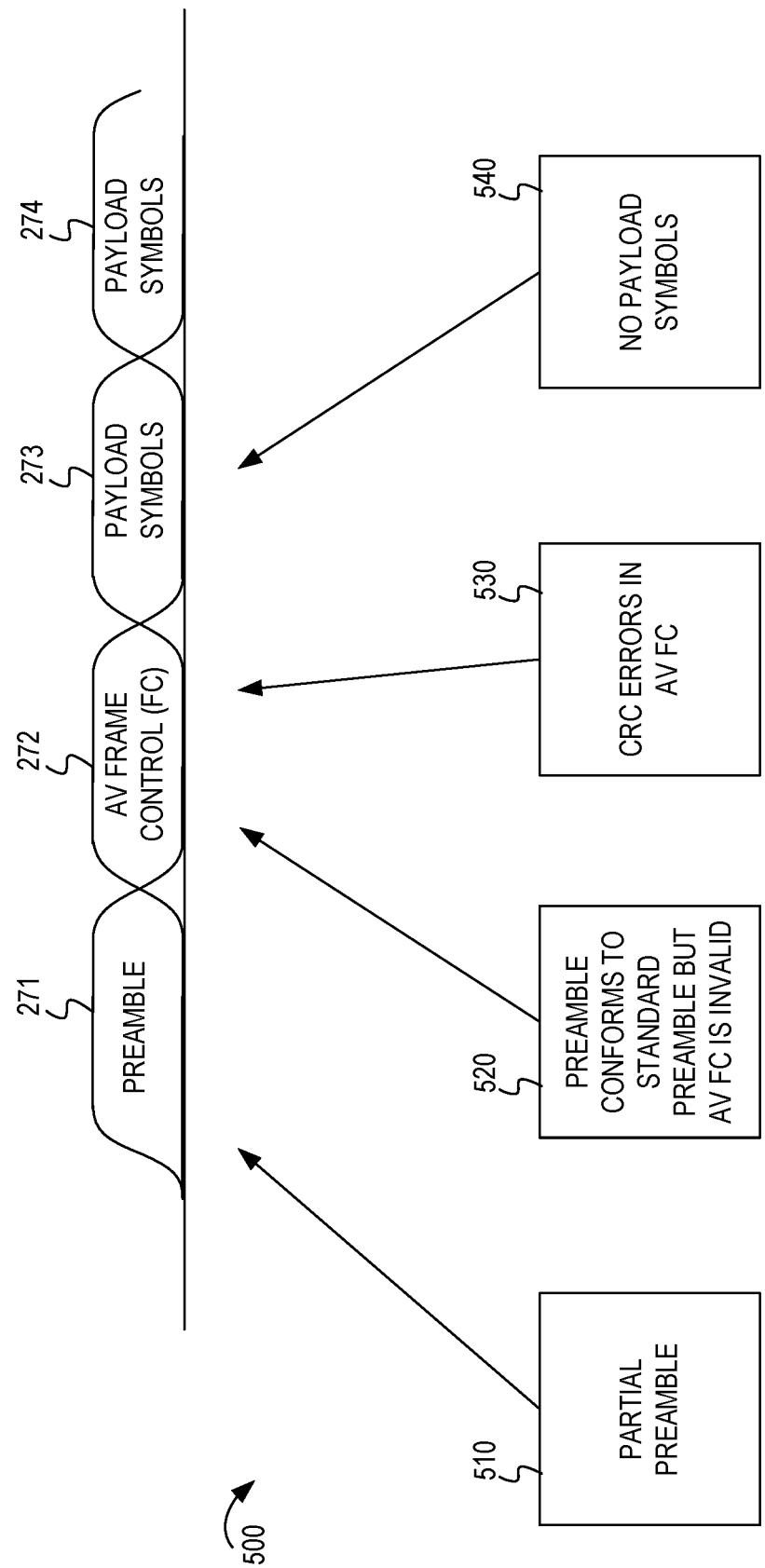
FIG. 5 shows example indicia of a denial of service attack based on processing a PPDU frame.

FIG. 5 shows example indicia 500 of a denial of service attack based on processing a PPDU frame. When a node (such as the first node 110 or the second node 120 described herein) receives a transmission, the node may attempt to process the transmission in accordance with a PPDU frame format. For example, the PPDU frame format may be defined by a PLC standard specification. The PPDU frame format may specify one or more preamble symbols (such as preamble 271), one or more frame control (FC) symbols (such as AV FC 272), and one or more payload symbols 273 and 274. However, an attacking node may omit some or all of the standard portions of the specified PPDU frame format. A node may detect indicia that the transmissions are associated with a denial of service attack when the transmission only partially conforms to the PPDU frame format. For example, the node may fail to process the transmissions in accordance with the expected PLC frame format. A failure to process a transmission may occur for one or more error conditions. In some implementations, a single error condition may be enough to determine the transmission is associated with a denial of service attack. Alternatively, or additionally, the denial of service attack may be associated with a quantity of error conditions exceeding a processing error threshold. In some implementations, the processing error threshold may be a fixed value. Alternatively, or additionally, the processing error threshold may be a dynamic value based on a quantity of nodes in the PLC network. In another alternative, the processing error threshold may be a dynamic value based on a quality metric associated with the communication medium, such as a noise measurement, a signal-to-noise ratio (SNR), or an amount of interference, among other examples. FIG. 5 shows some example error conditions that a node may experience when attempting to process one or more transmissions associated with a denial of service attack.

In a first example 510, an error condition may occur when the preamble 271 is incomplete. For example, if the transmission only includes one preamble symbol where the PPDU frame format defines two or more preamble symbols, the preamble 271 may be incomplete. Alternatively, the preamble 271 may be a symbol that includes part of a sequence associated with a standard preamble. After attempting to process the transmission, a node may count an error condition when the preamble 271 portion of the transmission is truncated or incomplete.

In a second example 520, an error condition may occur when the preamble 271 confirms to the standard preamble, but the AV FC 272 is invalid. For example, the AF FC 272 may be omitted or truncated. Alternatively, or additionally, the AV FC 272 may be invalid if it does not include one or more specified fields (such as the CC, the DT, the variant field or the FCCS). In another example, the AV FC 272 may include an incorrect format of the variant field that is associated with the delimiter type indicated in the DT field of the AV FC 272.

In a third example 530, an error condition may occur when the AV FC 272 fails a cyclic redundancy check (CRC). For example, if the AV FC 272 is omitted or includes dummy data, a node may experience a CRC error when comparing a calculated CRC of the AV FC 272 with the FCCS of the AV FC 272. When a node processes the AV FC 272, the node will access a portion of the transmission where the FCCS of the AV FC 272 is expected to be transmitted. When the transmission omits the AV FC 272 or includes dummy data in the AF FC 272, the CRC will indicate an error. When the node experiences a plurality of CRC errors associated with a corresponding plurality of transmissions, the node may determine that the transmissions are associated with a denial of service attack using a standard preamble following by an invalid AV FC 272 portion.

In a fourth example 540, an error condition may occur when the transmission does not include payload symbols following the preamble 271 and AV FC 272. For example, the attacking node may repetitively transmit the preamble 271 and AV FC 272 without payload symbols 273. A node may detect an error condition when processing the transmission as a PPDU and determining that the payload symbols are omitted or invalid.

Figure 6:
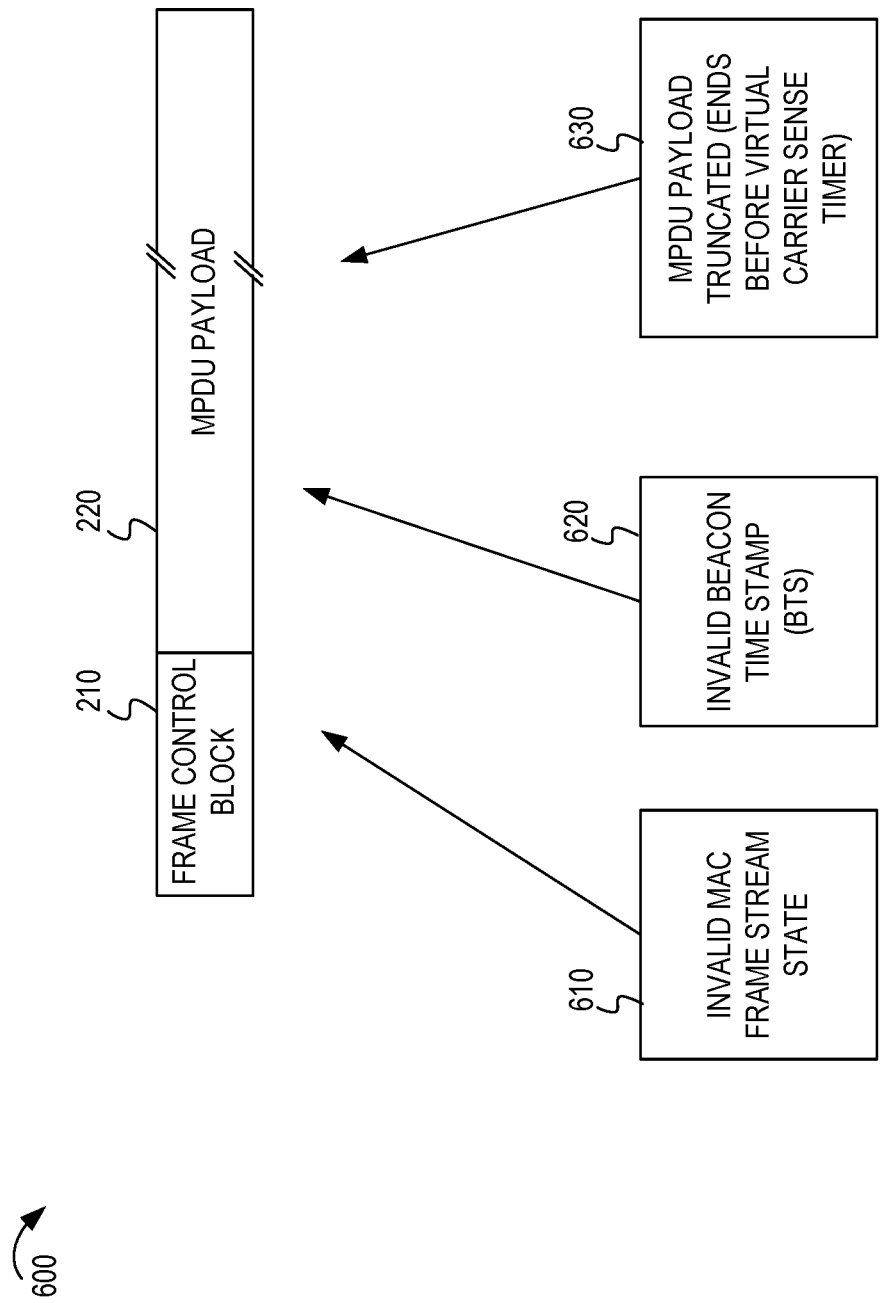
FIG. 6 shows example indicia of a denial of service attack based on processing a MPDU frame.

FIG. 6 shows example indicia 600 of a denial of service attack based on processing a MPDU frame. As described with reference to FIGS. 2A and 2B, the frame control block 210 of an MPDU may be incorporated in an AV FC portion of a PPDU. A PLC standard specification may specify the fields and valid values for the AV FC portion. For example, the AV FC portion of the PPDU may indicate a delimiter type associated with the MPDU. Depending on the delimiter type, the AV FC portion of the PPDU may include a variant field having frame control information from the frame control block 210 of the MPDU. When a node processes the AV FC portion according to a particular delimiter type, the node may determine that some values in the variant field are invalid. FIG. 6 includes two examples in which a variant field may include invalid information.

In a first example 610, the delimiter type indicated in the AV FC portion may be a "start of frame" (SOF) type. When the delimiter type is SOF, the variant field of the AV FC portion is defined to include one or more MAC frame stream fields. For example, the variant field may be expected to include a Management MAC Frame Stream Command field, a Data MAC Frame Stream Command field, a Management MAC Frame Stream Response field, and a Data MAC Frame Stream Response field (which may collectively be referred to as MAC Frame Stream fields).

The MAC Frame Stream fields are used as part of a MAC Framing process in which MAC Frames can be generated from MSDUs and multiple MAC Frames belonging to a same stream are concatenated into MAC Frame Streams. Each MAC Frame Stream can be segmented into PHY blocks (PBs) for transmission via a PPDU. A PLC standard specification may specify how the MAC Frame Stream fields operate. MAC The Management MAC Frame Stream Command and Data MAC Frame Stream Command fields include commands from the transmitting node's MAC Frame Stream to enable a receiving node to reassembly the stream. The Management MAC Frame Stream Response and Data MAC Frame Stream Response fields include a response from the transmitting node regarding the data sent in a preceding reverse SOF frame.

In accordance with an aspect of this disclosure, a node of a PLC network may track the MAC Frame Stream state associated with the MAC Frame Stream fields of one or more transmissions suspected of being associated with a denial of service attack. For example, a node may increase a count of error conditions when a Management MAC Frame Stream Response in one transmission does not correspond to an expected MAC Frame Stream state derived from a preceding transmission.

In a second example 620, the delimiter type indicated in the AV FC portion may be a "beacon" type. When the delimiter type is a beacon type, the MPDU payload may be expected to include a beacon time stamp (BTS). The BTS is a value based on a network time base (NTB). A node may observe the BTS in comparison with one or more preceding transmissions to verify the BTS is increasing as expected according to timing between the transmissions. In some cases, a denial of service attack may include identical BTS values in successive transmissions or may include dummy data in the BTS field of the MPDU payload. When a BTS value in one transmission is inconsistent with an expected BTS value associated with one or more previous BTS values (in one or more previous beacon type transmissions), the BTS value may be considered invalid. An invalid value for the BTS may represent an error condition and indicia of a denial of service attack.

FIG. 6 also shows example indicia 630 based on an invalid format for the MPDU frame processing. When a node detects a valid preamble and AV FC portion of the PPDU, the node may begin a virtual carrier sense (VCS) timer. According to the PLC standard specification, a VCS timer is maintained by all nodes to improve reliability of channel access during CSMA. The VCS timer is used to identify the expected CSMA state of the communication medium after a period of time. When a node detects a standard preamble, it may be configured to start a VCS timer to expire with the expected completion of the transmission that includes the standard preamble. In a denial of service attack, the attacking node may omit a payload portion of the transmission and repetitively transmit the standard preamble and AV FC portion of the PPDU. In accordance with this disclosure, a node may monitor the communication medium during the VCS timer to confirm that the transmission continues for the expected duration associated with the PPDU frame type.

Figure 7:
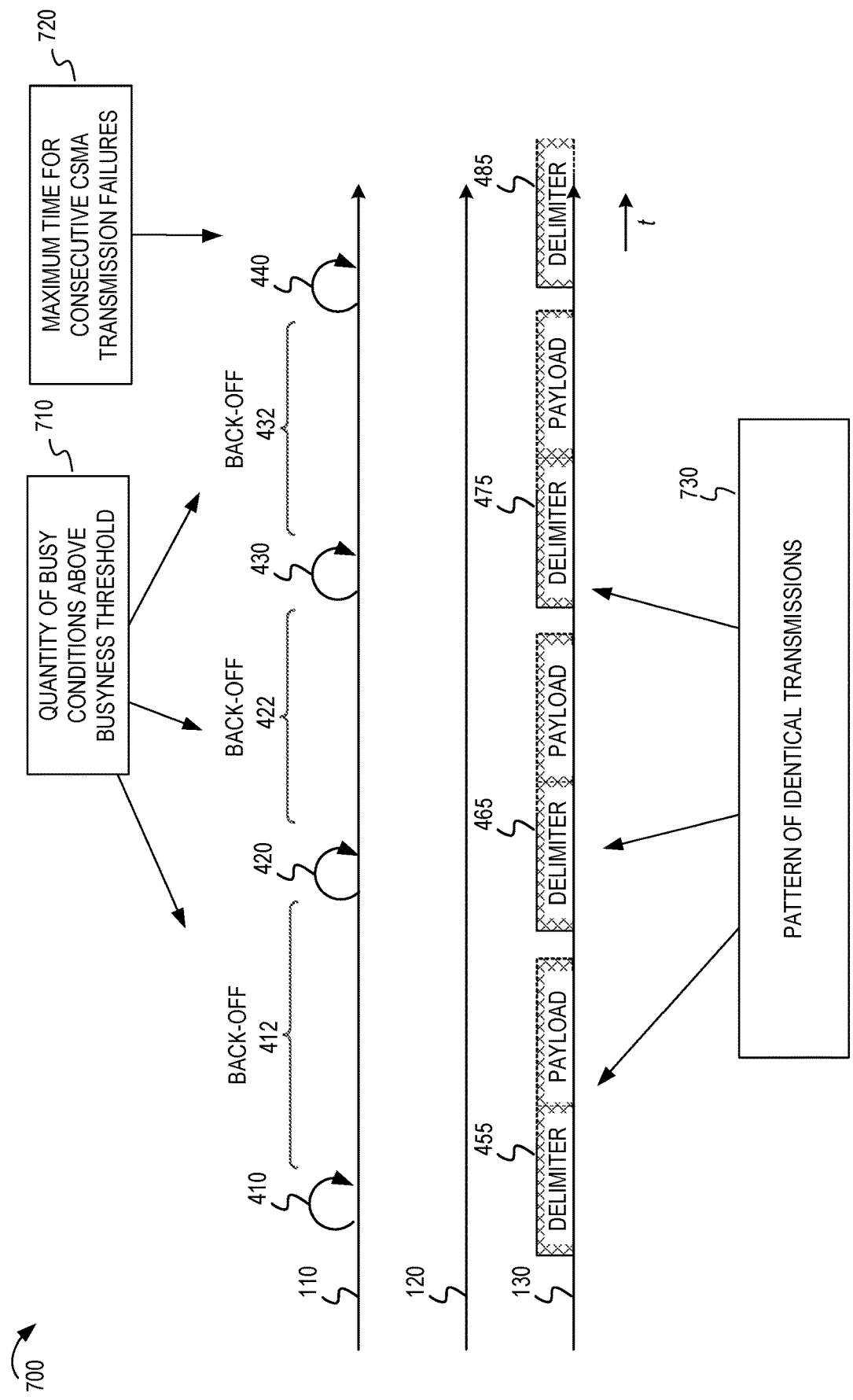
FIG. 7 shows example indicia of a denial of service attack based on a history of communication media activity.

FIG. 7 shows example indicia 700 of a denial of service attack based on a history of communication media activity. For reference, FIG. 7 includes the example denial of service attack as described with reference to FIG. 4. The attacking node 130 may continuously inject the transmissions 455, 465, 475, and 487 onto the communication medium so that each time the first node 110 performs a CSMA assessment 410, 420, 430, and 440, the first node 110 may determine the communication medium is busy (referred to as a busy condition) and refrain from accessing the communication medium for respective backoff periods 412, 422, 432, and so on. In a first example 710, the first node 110 may determine that a quantity of busy conditions is above a busyness threshold. For example, the first node 110 may maintain a counter that increments for each consecutive busy condition. After a threshold quantity, the first node 110 may determine that the plurality of consecutive busy conditions is associated with a denial of service attack. Alternatively, in a second example 720, the first node 110 may maintain a timer that indicates how long the first node 110 has experienced consecutive busy conditions on the communication medium resulting in CSMA transmission failures. When the timer reaches a maximum time for consecutive CSMA transmission failures, the first node 110 may determine that the pattern of consecutive busy conditions is associated with a denial of service attack.

In a third example 730, the first node 110 may compare the one or more transmissions 455, 465, 475, and 485 to determine if they are identical. In some cases, an attacking node may repetitively transmit the same transmission (such as a standard preamble) such that the one or more transmissions 455, 465, 475, and 485 contain the same transmission format. The first node 110 may determine that the one or more transmissions 455, 465, 475, and 485 are associated with a denial of service attack based on a pattern in which the transmissions 455, 465, 475, and 485 are identical transmissions.

Figure 8:
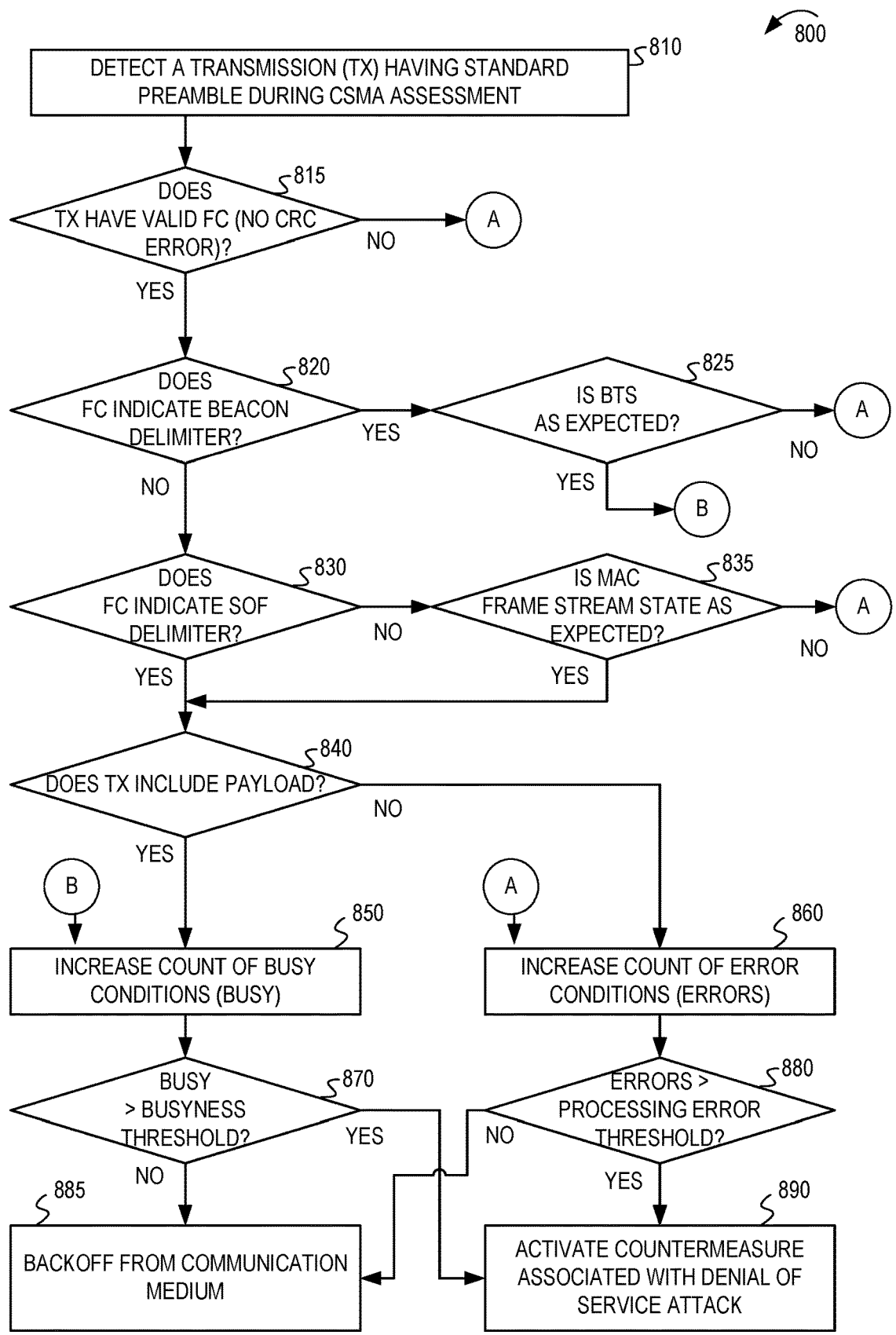
FIG. 8 shows an example process that implements a countermeasure in association with multiple indicia of a denial of service attack.

FIG. 8 shows an example process 800 that implements a countermeasure in association with multiple indicia of a denial of service attack. The operations of the process 800 may be implemented by a node of a PLC network, or any component thereof as described herein. In some implementations, the process 800 (or portions thereof) may be performed by a communication unit of a node, such the communication unit 114 or communication unit 124 described with reference to FIG. 1. In some implementations, the process 800 may be performed by a node or a component thereof, such as the first node 110, the second node 120, or the central node 150 described with reference to any of FIG. 1, 3, 4, 10, 11, 13, 14, or 17, respectively. In some implementations, the process 800 may be performed by an apparatus or a component thereof, such as the apparatus 2000 described with reference to FIG. 20. For brevity, the example process 800 is described as being performed by an apparatus that could be any of the above indicated nodes, communication units, or apparatuses, or a component thereof.

At block 810, the apparatus may detect a transmission having a standard preamble during a CSMA assessment of the communication medium. For example, the transmission may be formatted to include at least a standard preamble portion of a PPDU frame format, such as any one of the transmissions 455, 465, 475, and 485 described with reference to FIG. 4.

At block 815, the apparatus may determine whether the transmission has a valid FC portion. For example, the apparatus may attempt to process the AV FC symbol(s) of the transmission to determine whether the AV FC symbol(s) are formatted correctly. Additionally, or alternatively, the apparatus may determine if the FC portion of the transmission generates a CRC error indicating that the FC portion is invalid. If the transmission does not have a valid FC portion, the process may continue to block 860 (indicated by reference "A") associated with an error condition. Otherwise, the process may continue to block 820.

At block 820, the apparatus may determine whether a delimiter type field in the FC portion of the transmission indicates the transmission is a beacon. If so, the process may continue to block 825 to determine whether the BTS included in the transmission matches an expected BTS. The expected BTS may be derived from previous BTS values in previous beacon transmissions received by the apparatus. If the BTS value in the transmission does not match the expected BTS value, the process may continue to block 860 (indicated by reference "A") associated with an error condition. Otherwise, if the BTS value matches the expected BTS value, the process may continue to block 850 (indicated by reference "B").

Returning to block 820, if the delimiter type field in the FC portion of the transmission does not indicate the transmission is a beacon, the process may continue to block 830. At block 830, the apparatus may determine whether a delimiter type field in the FC portion of the transmission indicates the transmission is a start of frame (SOF) or a reverse start of frame (RSOF). If so, the process may continue to block 835. At block 835, the apparatus may determine whether the MAC Frame Stream fields of the transmission match an expected MAC Frame Stream state. The expected MAC Frame Stream state may be based on one or more previous transmissions. If the MAC Frame Stream fields in the transmission does not match the expected MAC Frame Stream state, the process may continue to block 860 (indicated by reference "A") associated with an error condition. Otherwise, if the MAC Frame Stream fields matches the expected MAC Frame Stream state, the process may continue to block 840.

Returning to block 830, if the delimiter type field in the FC portion of the transmission does not indicate the transmission is a SOF or RSOF, the apparatus may attempt to process the transmission using other types of delimiters. If the delimiter type in the FC portion of the transmission appears to be a valid type, the process my continue to block 840.

At block 840, that apparatus may monitor the communication medium during the VCS timer to verify whether the transmission includes a payload. If the transmission does not include a payload, the process may continue to block 860 associated with an error condition. If the transmission does include a payload, the process my continue to block 850.

At block 850 (also indicated by reference "B"), the apparatus may increase a count of busy conditions. For example, the transmission may contain the expected parts of a valid transmission even though it may be part of a denial of service attack. By counting the quantity of consecutive busy conditions, the apparatus may obtain indicia of the denial of service attack.

At block 870, the apparatus may compare the count of busy conditions with a busyness threshold. The busyness threshold may be a fixed value or a dynamic value. For example, the busyness threshold may be a fixed value of five (5) consecutive CSMA busy conditions. At block 870, if the count of busy conditions is above the busyness threshold, the process may continue to block 890 to activate a countermeasure associated with the denial of service attack. Alternatively, at block 870, if the count of busy conditions is below the busyness threshold, the process may continue to block 885. At block 885, apparatus may backoff from the communication medium for a period of time and re-attempt a CSMA assessment after a backoff timer.

Returning to block 860 (also indicated by reference "A"), the apparatus may process an error condition associated with any of the error conditions detected in blocks 815, 825, or 835. At block 860, the apparatus may increase a count of error conditions. At block 880, the apparatus may compare the count of error conditions with a processing error threshold. If the count of error conditions is above the processing error threshold, the process may continue to block 890 to activate a countermeasure associated with the denial of service attack. Alternatively, at block 880, if the count of error conditions is below the processing error threshold, the process may continue to block 885. At block 885, apparatus may backoff from the communication medium for a period of time and re-attempt a CSMA assessment after a backoff timer.

FIGS. 5-7 have demonstrated several techniques and indicia that enable a node may detect a denial of service attack associated with an exploitation of a CSMA mechanism of a PLC network. Other techniques and indicia may enable a node to detect a denial of service attack associated with other exploitations a PLC network. For example, a denial of service attack may exploit a priority contention mechanism of the PLC, such as the denial of service attack described herein with reference to FIG. 14. The example denial of service attacks described herein are provided for pedagogical purposes and the techniques of this disclosure may mitigate other types of denial of service attacks.

A countermeasure may be implemented to mitigate denial of service attacks. In some aspects, a countermeasure may be implemented before a denial of service attack is active such that the countermeasure prevents or limits the effectiveness of a denial of service attack before it is present in the communication medium. Alternatively, or additionally, a countermeasure may be activated in response to a detection of a denial of service attack. This disclosure includes several example countermeasures that may be used to mitigate denial of service attacks.

Figure 9:
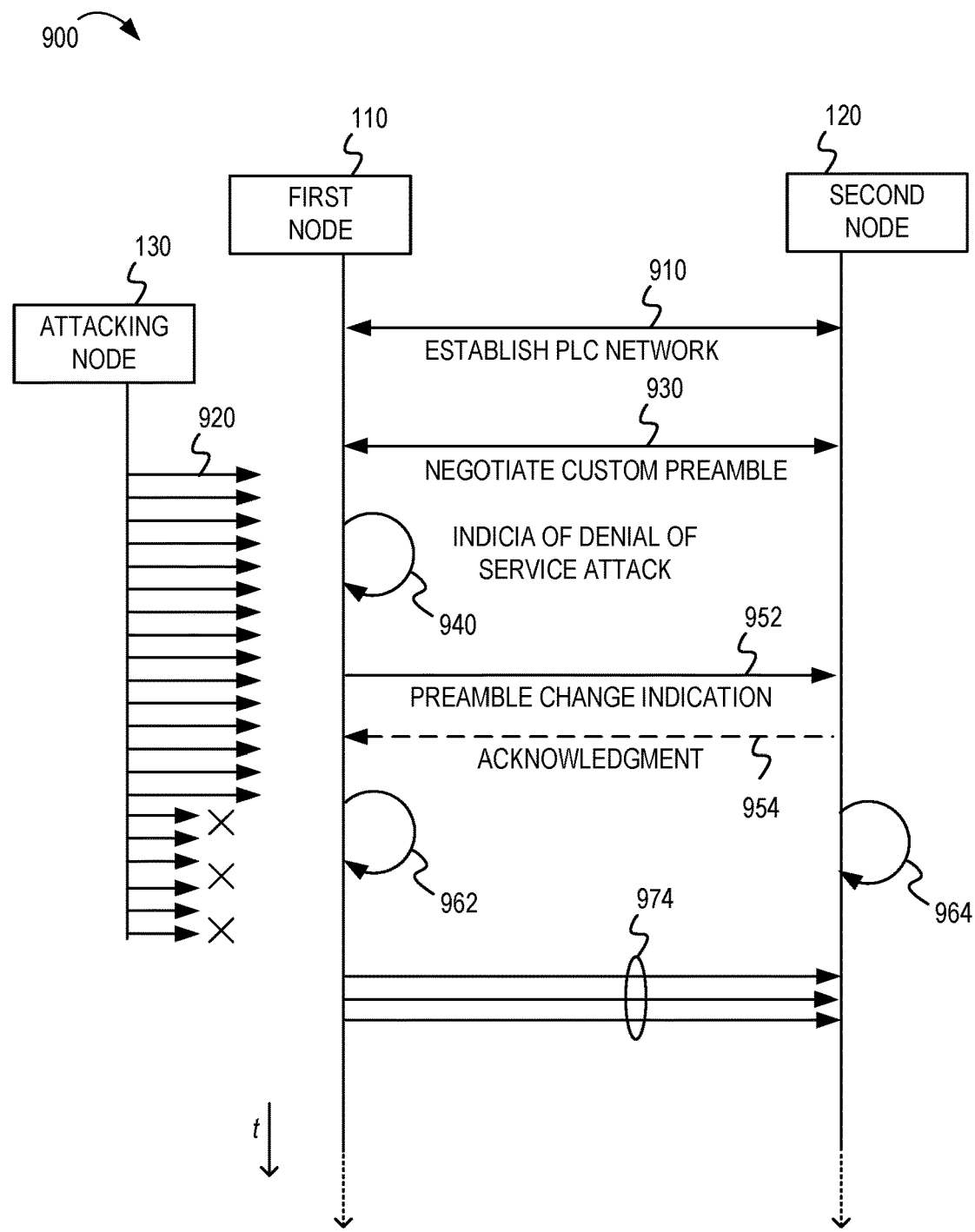
FIG. 9 shows a timing diagram in which an example countermeasure is activated in association with a denial of service attack.

FIG. 9 shows a timing diagram 900 in which an example countermeasure is activated in association with a denial of service attack. The timing diagram 900 shows a first node 110 and a second node 120 associated with a PLC network. The timing diagram 900 also shows an attacking node 130 attempting to attack the PLC network using a denial of service attack.

The first node 110 and the second node 120 may exchange messages 910 to establish a PLC network. For example, the first node 110 and the second node 120 may exchange sounding messages, signal level measurements, association messages, or configuration messages, among other examples associated with creating a PLC network that includes the first node 110 and the second node 120. In some implementations, the first node 110 and the second node 120 may establish a network encryption key (NEK), a network membership key (NMK), or both, associated with the PLC network. In some implementations, the messages 910 to establish the PLC network may include messages associated with a signal level attenuation characterization (SLAC) protocol of a PLC standard specification.

The first node 110 and the second node 120 may exchange messages 930 to negotiate a custom preamble. The custom preamble may be different from a standard preamble specified by a PLC standard specification. When the countermeasure is activated, the first node 110 and the second node 120 may disregard communications that have the standard preamble and attempt to communicate via the communication medium using the custom preamble in lieu of the standard preamble. The custom preamble may be a sequence known to the first node 110 and the second node 120 but unknown to an attacking node 130. The custom preamble may include one or more OFDM symbols configured to replace a standard preamble symbol. In some implementations, the messages 930 to negotiate the custom preamble may be encrypted using the NEK or other secure messaging technique. Furthermore, the messages 930 may be based on a modification of the SLAC protocol to include negotiation of a custom preamble. The messages 930 to negotiate the custom preamble may be exchanged any time after the PLC network is established. For example, in some implementations as shown in FIG. 9, the messages 930 may be exchanged before a denial of service attack is present. Alternatively, or additionally, the messages 930 may be exchanged after the denial of service attack is detected.

At some point, an attacking node 130 may transmit one or more transmissions 920 injected onto the communication medium. At block 940, the first node 110 may observe the transmissions 920 and detect the indicia of the denial of service attack associated with the transmissions 920. The indicia of the denial of service attack may include any one or more of the examples described with reference to FIGS. 5-8. Although FIG. 9 shows the first node 110 detects the denial of service attack, it may be apparent that either the first node 110 or the second node 120 (or another node, not shown) may obtain the indicia of the denial of service attack by monitoring the transmissions 920 on the communication medium.

Returning to the example of FIG. 9, when the first node 110 detects the indicia of the denial of service attack, the first node 110 may communicate a preamble change indication 952 to the second node 120. For example, the preamble change indication 952 may be communicated by any of the examples described with reference to FIG. 12. The preamble change indication 952 informs the second node 120 that the first node 110 will use the custom preamble for subsequent PLC network communications 974. In some aspects, the preamble change indication 952 may be a message that indicates the first node 110 has detected the denial of service attack and is activating a countermeasure associated with the denial of service attack. In the example of FIG. 9, the countermeasure includes the use of a custom preamble. In some implementations, the second node 120 may respond to the preamble change indication 952 by communicating an acknowledgement 954 to the first node.

At block 962, the first node 110 may configure its communication unit to disregard communications associated with the standard preamble when performing a CSMA assessment. Furthermore, the first node 110 may configure its communication unit to utilize the custom preamble for subsequent CSMA assessments, in transmitting subsequent PLC network communications to the second node, and for receiving subsequent PLC network communications from the second node 120. At block 964, the second node 120 may similarly configure its communication unit to utilize the custom preamble for CSMA assessments and for transmitting or detecting subsequent PLC network communications.

After implementing the custom preamble at blocks 962 and 964, the first node 110 and the second node 120 may include the custom preamble in lieu of the standard preamble for subsequent PLC network communications. For example, the first node 110 may include the custom preamble as the first symbol of each subsequent PLC network communication 974 to the second node 120. The second node 120 may monitor the communication medium for the custom preamble and receive the subsequent PLC network communication 974 that includes the custom preamble.

FIG. 9 shows an example in which the custom preamble is activated using a preamble change indication 952 after the first node 110 detects the indicia of the denial of service attack at block 940. In some implementations, the custom preamble may be activated before the denial of service attack is present. For example, the preamble change indication 952 may be included as part of the messages 930 to negotiate the custom preamble. Thus, the PLC network may implement the custom preamble (as described with reference to blocks 962 and 964) before the denial of service attack occurs.

Figure 10:
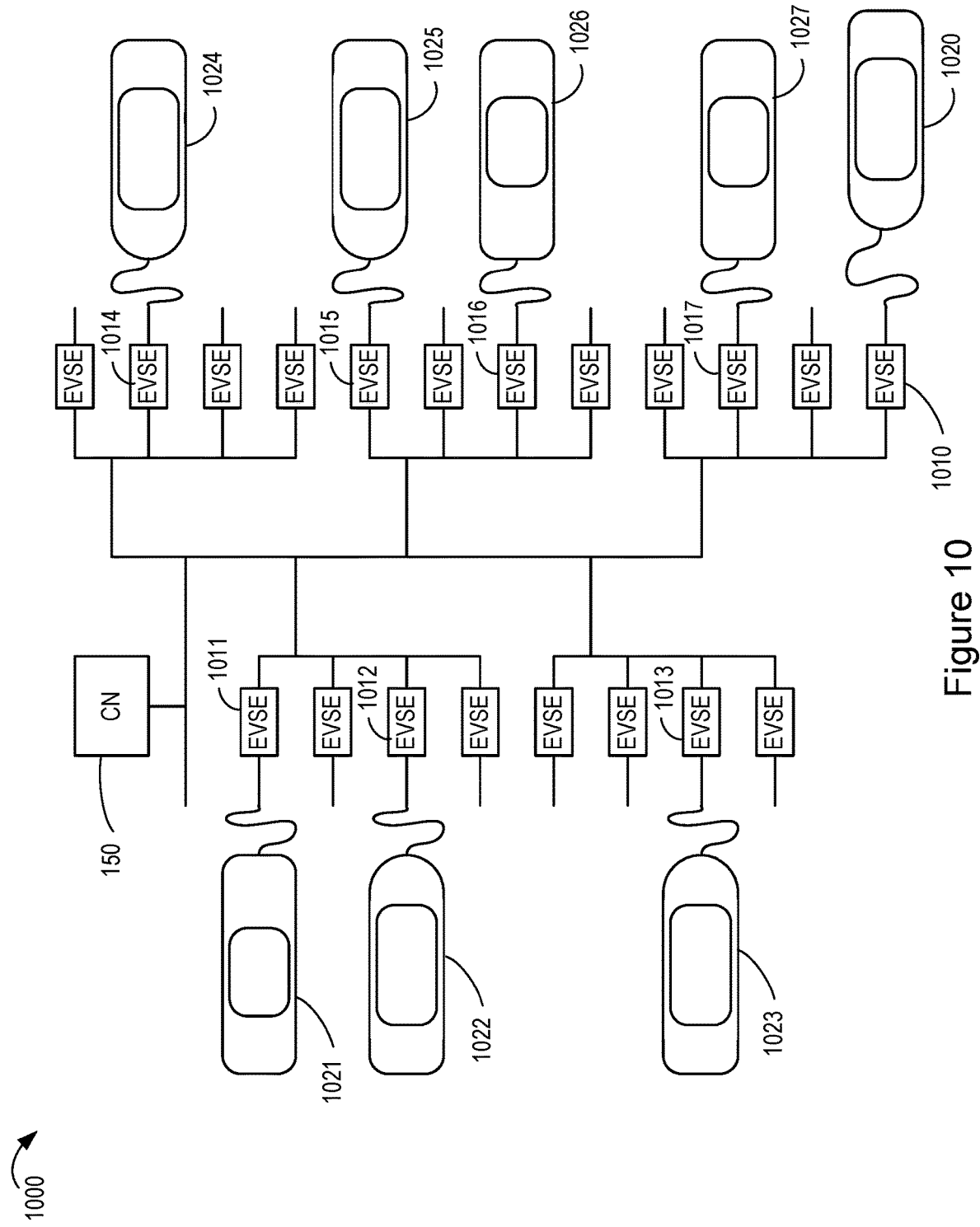
FIG. 10 depicts an example charging station that includes a plurality of electric vehicle supply equipment (EVSEs) for charging a corresponding plurality of electric vehicles (EVs).

FIG. 10 depicts an example charging station 1000 that includes a plurality of EVSEs for charging a corresponding plurality of EVs. The example charging station 1000 includes several EVSEs (such as EVSEs 1010, 1011, 1012, 1013, 1014, 1015, 1016, and 1017) capable of charging various EVs (such as EVs 1020, 1021, 1022, 1023, 1024, 1025, 1026, and 1027), respectively. The example charging station 1000 also may include a central node 150 (sometimes also referred to as a central coordinator). The central node 150 may coordinate the addition of nodes to the PLC network or the establishment of new PLC networks. In some implementations, each pair of EVSE and EV may be referred to as a PLC network such that the charging station operates multiple PLC networks (one for each pair of EVSE and EV) managed by the central node. Alternatively, or additionally, the EVSEs may belong to a PLC network that includes the central node 150 such that the central node 150 manages network operations of the EVSEs and EVs at the charging station 1000. As described further with reference to FIG. 11, the central node 150 may participate in the activation of a countermeasure in association with a denial of service attack. For example, any one of the nodes within EVSEs 1010, 1011, 1012, 1013, 1014, 1015, 1016, or 1017 or within EVs 1020, 1021, 1022, 1023, 1024, 1025, 1026, or 1027 may communicate a preamble change indication (or denial of service attack detection message) to the central node 150. The central node 150 may activate a countermeasure such that all of the nodes within the EVSEs 1010, 1011, 1012, 1013, 1014, 1015, 1016, and 1017 and within EVs 1020, 1021, 1022, 1023, 1024, 1025, 1026, and 1027 benefit from the countermeasure to rapidly mitigate the denial of service attack.

Figure 11:
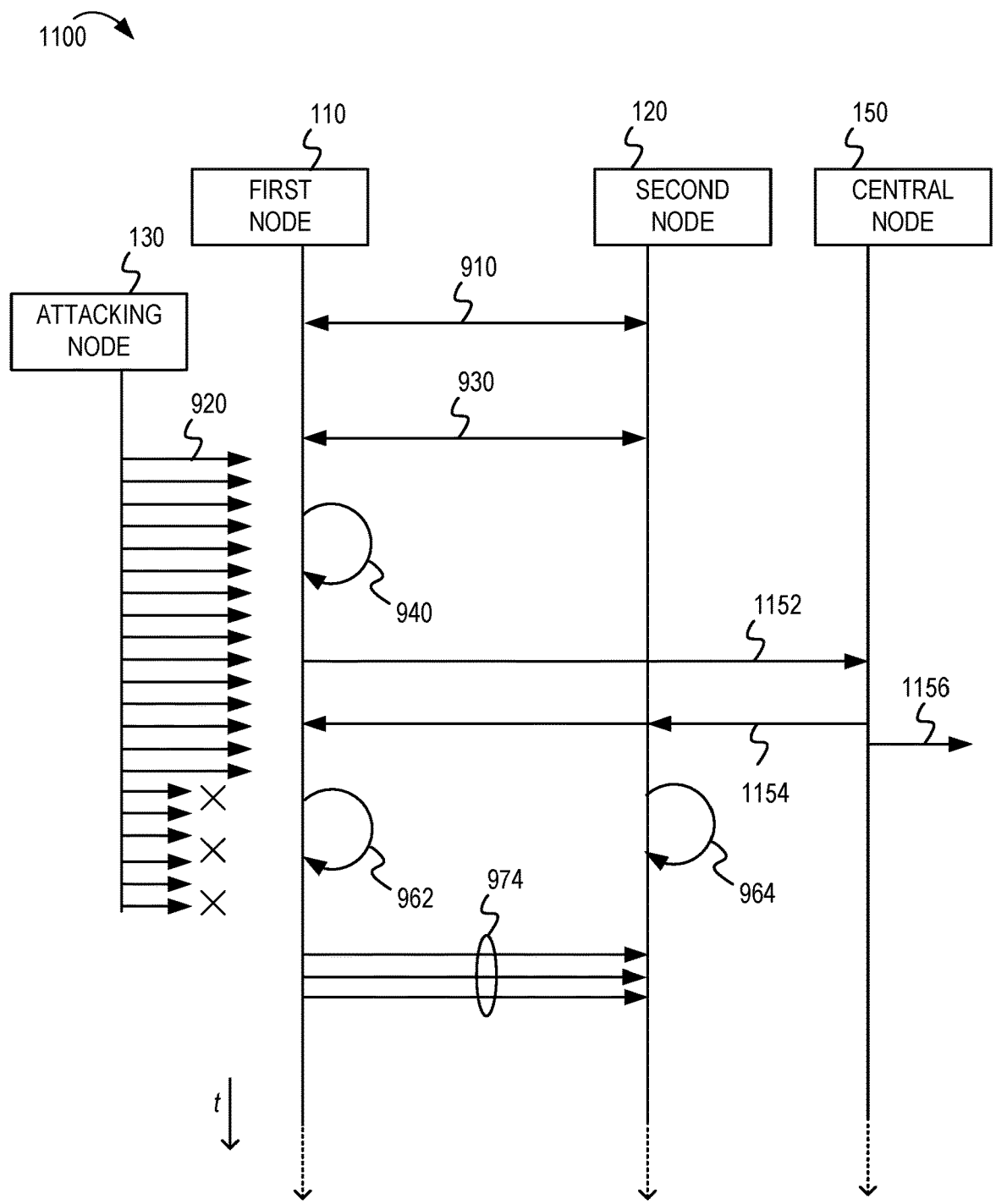
FIG. 11 shows a timing diagram in which a central node participates in an example countermeasure activated in association with a denial of service attack.

FIG. 11 shows a timing diagram 1100 in which a central node participates in an example countermeasure activated in association with a denial of service attack. The timing diagram 1100 shows a first node 110 and a second node 120 associated with a PLC network. The timing diagram 1100 also shows a central node 150 configured to manage operations of the PLC network and an attacking node 130 attempting to attack the PLC network using a denial of service attack. The first node 110 and the second node 120 may exchange messages 910 to establish a PLC network. For example, the messages 910 may be similar to the corresponding messages 910 described with reference to FIG. 9. Furthermore, as described with reference to FIG. 9, the first node 110 and the second node 120 may exchange messages 930 to negotiate a custom preamble.

At some point, an attacking node 130 may transmit one or more transmissions 920 injected onto the communication medium. At block 940, the first node 110 may observe the transmissions 920 and detect the indicia of the denial of service attack associated with the transmissions 920. The indicia of the denial of service attack may include any one or more of the examples described with reference to FIGS. 5-8. When the first node 110 detects the indicia of the denial of service attack, the first node 110 may communicate a preamble change indication 1152 to the central node 150. For example, the preamble change indication 1152 may be communicated by any of the examples described with reference to FIG. 12. The preamble change indication 1152 may inform the central node 150 that the first node 110 has detected the denial of service attack. Alternatively, or additionally, the preamble change indication 1152 may represent a request to activate a countermeasure in association with the denial of service attack. The preamble change indication 1152 may be configured to cause the central node 150 to activate the countermeasure and inform other nodes of the PLC network, including the second node 120) to use the custom preamble for subsequent PLC network communications 974. For example, the central node 150 may transmit a preamble change instruction 1154 to the second node 120. In some implementations, the preamble change instruction 1154 may be a broadcast communication that also informs the first node 110 regarding the activation of the countermeasure. Furthermore, in some implementations, the central node 150 may communicate a preamble change instruction 1156 to other nodes or other PLC networks associated with the central node 150, such as the nodes within EVSEs and EVs at a charging station.

At blocks 962 and 964, the first node 110 and the second node 120, respectively, may implement the countermeasure as described with reference to FIG. 9. For example, the first node 110 and the second node 120 may implement a custom CSMA mechanism that monitors for the custom preamble rather than the standard preamble. Thereafter, the subsequent PLC network communications 974 may include the custom preamble.

Figure 12:
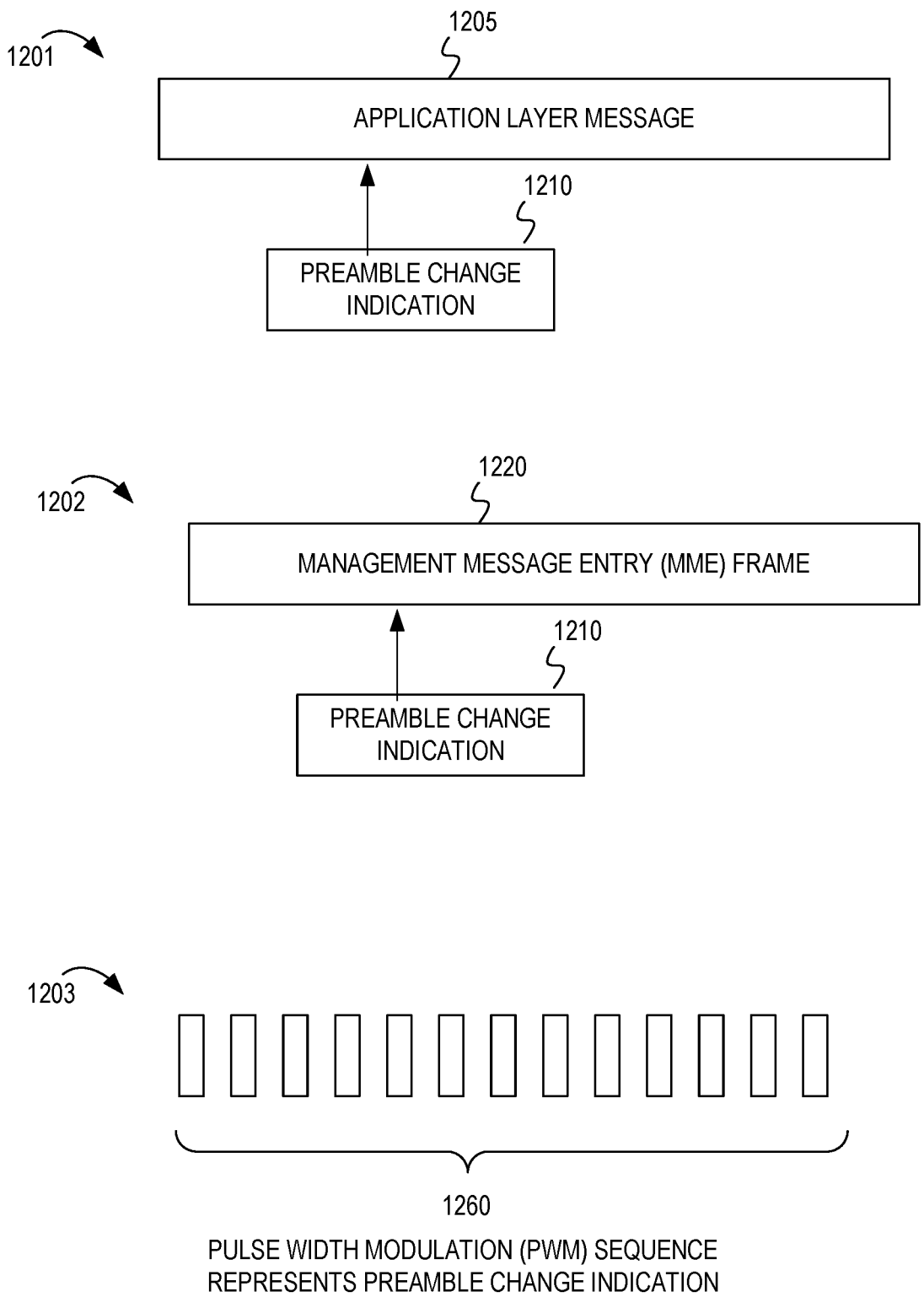
FIG. 12 shows example preamble change indications.

FIG. 12 shows example preamble change indications. In a first example 1201, the preamble change indication 1210 may be included in an application layer message 1205. Examples of an application layer message 1205 may include a packet to or from an application in a central controller, EVSE or EV, among other examples. In some implementations, an application layer message 1205 may be a Transmission Control Protocol/Internet Protocol (TCP/IP) packet to or from a Central Controller of an Automotive Device. In a second example 1202, the preamble change indication 1210 may be included in a MAC frame, such as a management message entry (MME) frame 1220. In a third example 1203, the preamble change indication 1210 may be represented as a PWM sequence 1260. For example, the PWM sequence 1260 may include a particular duty cycle or sequence of PWM pulses. The nodes of a PLC network may monitor the communication medium for the PWM sequence 1260. A first node may transmit the PWM sequence 1260 via the communication medium to signal a preamble change indication. A second node may receive the PWM sequence 1260 and interpret it as the preamble change indication.

Although FIG. 12 describes example preamble change indications which may be used to activate a countermeasure associated with a custom preamble to mitigate a CSMA exploitation attack, the same types of communications also may be used to activate a countermeasure associated with custom priority resolution symbols to mitigate a priority contention exploitation attack.

FIG. 13 shows an example priority contention mechanism 1300. A PLC standard specification may specify a priority contention mechanism that enables nodes of a PLC network to indicate their respective priorities. When one node has a lower priority than another node, the node with the lower priority may be configured to defer contending for the communication medium for a backoff period. This enables node(s) having higher priority to contend for access to the communication medium ahead of other nodes having a lower priority. FIG. 13 provides an example in which a first node 110 has a higher priority relative to a second node 120.

After a previous PPDU 1310 (by any node in the PLC network), there are priority resolution slots (PRSs) 1315. In the example of FIG. 13, there are two PRSs (sometimes referred to a PRS0 and PRS1). The nodes may signal their priority by transmitting a standard priority resolution symbol during the PRSs according to one of four options:
  No priority resolution symbol in PRS0 or PRS1 may indicate a priority of "0"
  A priority resolution symbol in PRS0 may indicate a priority of "1"
  A priority resolution symbol in PRS1 may indicate a priority of "2"
  Priority resolution symbols in both PRS0 and PRS1 may indicate a priority of "3"

In the example of FIG. 13, the first node 110 may indicate a priority of "2" by transmitting the priority resolution symbol during the PRS1. The second node 120 may indicate a priority of "1" by transmitting the priority resolution symbol during PRS0. When the second node 120 determines that it has a lower priority compared to the first node 110, the second node may refrain from contending for access and wait for a backoff period 1332 before contending for access. Meanwhile, the first node 110 may contend (shown at block 1330) for access to the communication medium. For example, the first node 110 may contend for access by performing a CSMA assessment and determining that the communication medium is idle. After determining that the first node 110 has the highest priority and the communication medium is idle, the first node 110 may transmit a PLC network communication (such as a delimiter 1340 and payload 1350) on the communication medium.

While the priority contention mechanism is a useful feature of a PLC network, it may be exploited for a denial of service attack.

FIG. 14 shows an example denial of service attack 1400 that exploits the priority contention mechanism. The standard priority contention mechanism (as specified in a PLC standard specification) uses standard priority resolution symbols. The standard priority resolution symbols are documented and predefined according to the PLC standard specification. As shown in FIG. 14, an attacking node may exploit this fact by continually transmitting the standard priority resolution symbols 1410 to indicate the highest priority. In some cases, the attacking node 130 may not be aware when the previous PPDU 1310 has ended, but because it may continuously inject the standard priority resolution symbols 1410 onto the communication medium, there is a likelihood that the standard priority resolution symbols 1410 may overlap with a set of priority resolution slots 1315. For example, the standard priority resolution symbols 1415 and 1417 overlap with the priority resolution slots 1315. Furthermore, because the standard priority resolution symbols 1415 and 1417 are included in both PRS0 and PRS1, they may indicate the highest priority "3." The first node 110 and the second node 120 may consider their priority as being lower than the priority of the attacking node 130 and both may back-off from contention (shown at backoff 1422 and 1332, respectively). After the respective backoff periods 1422 and 1332, the first node 110 and the second node 120 may again participate in the priority contention mechanism during PRSs 1435 and PRSs 1445. Absent the techniques of this disclosure, it may be possible for the attacking node 130 to perform a denial of service attack by continuously transmitting a higher priority than the first node 110 and the second node 120.

The detection techniques and countermeasures for a denial of service attack that exploits the priority contention mechanism may be similar to those for a denial of service attack that exploits the CSMA mechanism. For example, the first node 110 or the second node 120 may detect indicia of the denial of service attack based on history of failures to win priority over a period of time or over a series of consecutive priority resolution slots. The first node 110 or the second node 120 may obtain indicia of the denial of service attack when an amount of time associated with consecutive priority contention backoff periods exceeds a maximum time limit, similar to the examples described with reference to FIG. 7. A countermeasure for this type of denial of service attack may include the use of a custom priority resolution symbol rather than the standard priority resolution symbol. For example, the custom priority resolution symbol may be negotiated between the first node 110 and the second node 120. Thereafter, the first node 110 and the second node 120 may use a custom priority contention mechanism that disregards the standard priority resolution symbol and instead monitors the priority resolution slots for the custom priority resolution symbol. Furthermore, a priority resolution symbol change activation may be communicated to activate the countermeasure, similar to the preamble change activation described herein with reference to FIGS. 9, 11 and 12.

Figure 15:
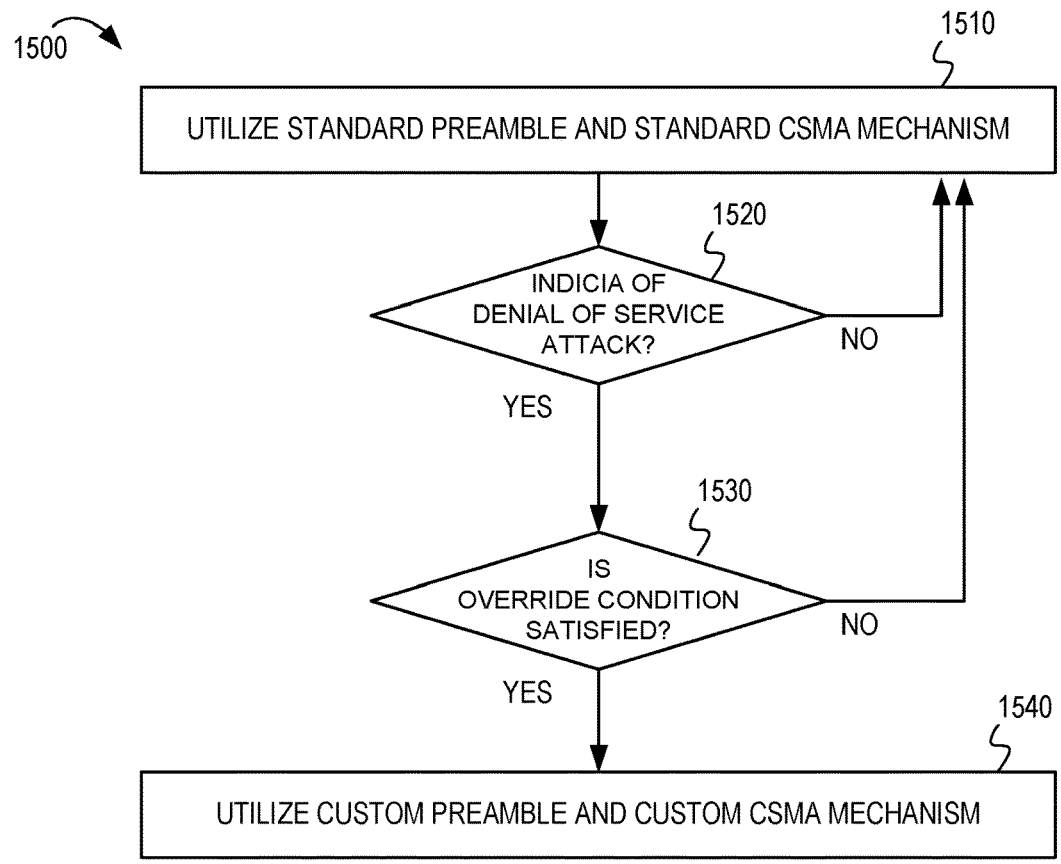
FIG. 15 depicts a flowchart in which an example countermeasure is activated in association with a denial of service attack and an override condition.

FIG. 15 depicts a flowchart in which an example countermeasure is activated in association with a denial of service attack and an override condition. The operations of the process 1500 may be implemented by a node of a PLC network, or any component thereof as described herein. In some implementations, the process 1500 (or portions thereof) may be performed by a communication unit of a node, such the communication unit 114 or communication unit 124 described with reference to FIG. 1. In some implementations, the process 1500 may be performed by a node or a component thereof, such as the first node 110, the second node 120, or the central node 150 described with reference to any of FIG. 1, 3, 4, 10, 11, 13, 14, or 17, respectively. In some implementations, the process 1500 may be performed by an apparatus or a component thereof, such as the apparatus 2000 described with reference to FIG. 20. For brevity, the example process 1500 is described as being performed by an apparatus that could be any of the above indicated nodes, communication units, or apparatuses, or a component thereof.

At block 1510, the apparatus may initially utilize the standard preamble and the standard CSMA mechanism. For example, the standard preamble and the standard CSMA mechanism may be specified in a PLC standard specification. Similarly, the apparatus may utilize a standard priority resolution symbol and standard priority contention mechanism.

At block 1520, the apparatus may determine whether it has received indicia of a denial of service attack. For example, the apparatus may observe one or more transmissions for any of the error conditions or excessive busy conditions described with reference to FIGS. 5-8. If the apparatus detects the denial of service attack, the process may continue to block 1530. Otherwise, the process may return to block 1510.

At block 1520, the apparatus may determine whether an override condition is satisfied. Example override conditions are describe further with reference to FIG. 16. When the override condition is satisfied, the process may continue to block 1540. Otherwise, the process may return to block 1510. The override condition may be implemented to prevent the nodes from overriding the standard CSMA mechanism or standard priority resolution mechanism unless a countermeasure can be activated without impacting operation of the PLC network. For example, in some aspects, the countermeasure may include disregarding transmissions that include the standard preamble or standard priority resolution symbols. However, if the signal strength of the transmissions is stronger than a threshold condition, the first node 110 and the second node 120 may be unable to disregard the transmissions and communicate via the communication medium. In some implementations, a countermeasure may not be activated unless the override condition is satisfied.

At block 1540, the apparatus may activate the countermeasure. For example, the apparatus may utilize the custom preamble and custom CSMA rather than the standard preamble and standard CSMA. Alternatively, or additionally, the apparatus may utilize the custom priority resolution symbols and custom priority contention mechanism rather than the standard priority resolution symbols and standard priority contention mechanism.

Figure 16:
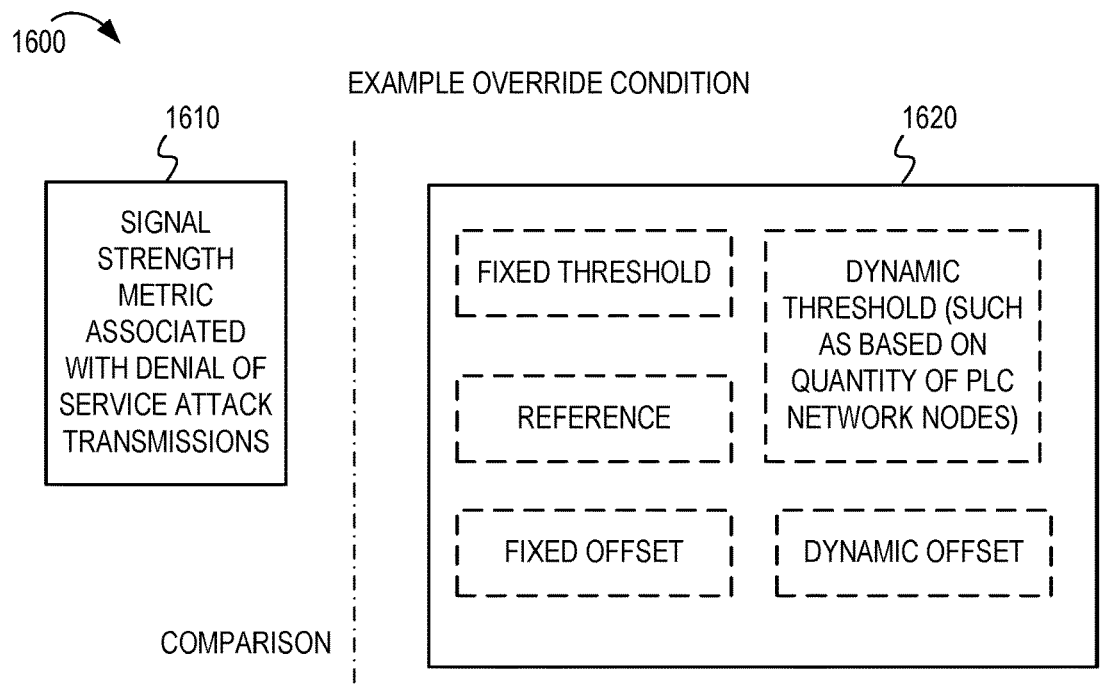
FIG. 16 shows example override conditions.

FIG. 16 shows an example override condition 1600. The example override condition 1600 may be satisfied when the signal strength metric 1610 of the denial of service attacks is below a signal strength threshold 1620. For example, the signal strength metric may be an SNR value, an amplitude map, a metric indicative of front end gain at a receiver of the node, or a metric associated with an analog-to-digital converter (ADC) of the receiver, among other examples. In some implementations, the signal strength metric may be measured for the standard preamble portion of the denial of service attack transmissions. The signal strength metric 1610 may be compared with a signal strength threshold 1620. The signal strength threshold 1620 may be associated with any combination of a fixed threshold, a reference signal strength associated with previous communications between the first node and the second node, a fixed offset value associated with the reference signal strength, a dynamic threshold associated with a quantity of authenticated nodes in the PLC network, or a dynamic offset value associated with a quantity of CSMA collisions on the communication medium.

As an example, for pedagogical purposes, the signal strength threshold 1620 ("T") may calculated as:

$$T = X \pm Y \tag{1}$$

where "X" is a reference value and "Y" is an offset. In some implementations, the reference value (X) may be based on previous communications between the first node and the second node or may be a fixed reference value. In some implementations, the offset "Y" may be a fixed offset value. Alternatively, or additionally, the offset "Y" may be derived from a combination of offsets. For example, offset Y may be calculated by adding a first offset Y1 and a second offset Y2, where the first offset Y1 is a static value derived from experimental data and the second offset Y2 is a dynamic value. In some implementations, the second offset Y2 may be proportional to a quantity of robust (ROBO) communication failures detected on the communication medium, where the ROBO communication failures occur when a node encounters a communication collision with another node. Typically, ROBO communication failures may increase as the number of nodes in the PLC network increases. Thus, in some implementations, the offset value Y2 may be proportional to a quantity of nodes in the PLC network.

The example override condition 1600 may be satisfied when the signal strength metric 1610 associated with the standard preamble is less than the signal strength threshold 1620. For example, the signal strength metric 1610 may be indicative the standard preamble has been detected, and the signal strength metric 1610 being below the signal strength threshold 1620 may be indicative that the standard preamble is part of a denial of service attack. In some implementations, the signal strength threshold 1620 may be adjusted (such as increased) when the signal strength metric 1610 is above the signal strength threshold 1620 but standard preamble is known to be part of a denial of service attack based on other indicia described herein.

Figure 17:
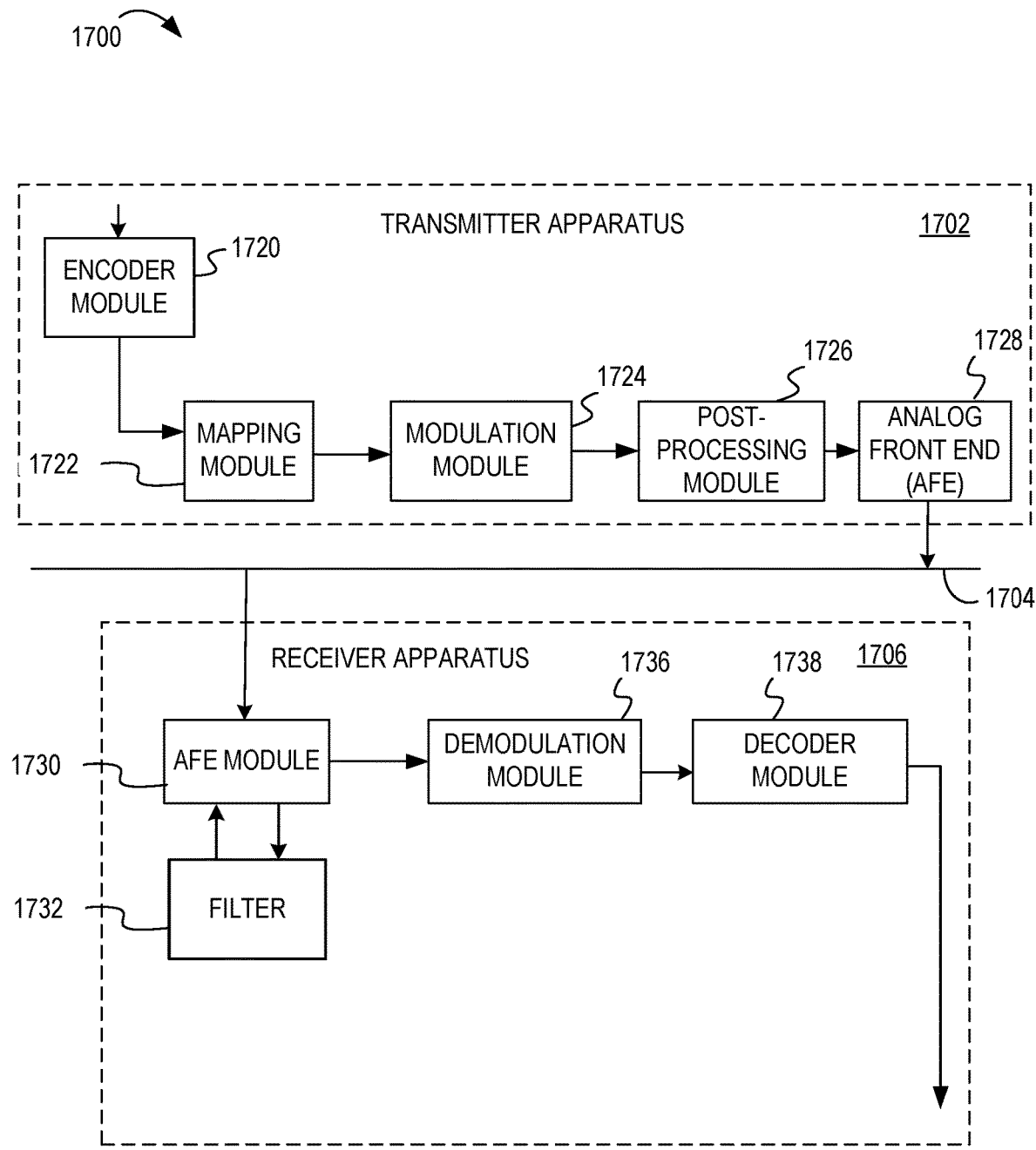
FIG. 17 shows a block diagram conceptually illustrating an example node capable of implementing a countermeasure.

FIG. 17 shows a block diagram conceptually illustrating an example node 1700 capable of implementing a countermeasure. The node 1700 may include a transmitter apparatus 1702 for transmitting a signal (such as a sequence of OFDM symbols) over a communications medium 1704 to a receiver apparatus 1706. The transmitter apparatus 1702 and receiver apparatus 1706 can both be incorporated into a communication unit (such as communication units 114 and 124 described with reference to FIG. 1) at each node (such as the first node 110 and the second node 120). The communication medium 1704 can represent a communications channel from one device to another over a wired or wireless network. For example, the communication medium 1704 may be an example of communication medium 115 described with reference to FIG. 1.

At the transmitter apparatus 1702, modules implementing the PHY layer may receive an MPDU from the MAC layer (not shown). The MPDU is sent to an encoder module 1720 to be processed, which may include scrambling, error correction coding and interleaving. The encoded MPDU may be referred to as the PPDU. The encoder module 1720 also may generate FC symbols for the PPDU. The PPDU is fed into a mapping module 1722 that takes groups of data bits (such as 1, 2, 3, 4, 6, 8, or 10 bits), depending on the constellation used for the current symbol (such as a BPSK, QPSK, 8-QAM, 15-QAM constellation), and maps the data value represented by those bits onto the corresponding amplitudes of in-phase (I) and quadrature-phase (Q) components of a carrier waveform of a modulation symbol. Alternatively, any appropriate mapping scheme that associates data values to modulated carrier waveforms can be used. The mapping module 1722 may also determine the type of modulation to be used on each of the carriers (or "tones") according to a tone map. The tone map can be a default tone map, or a customized tone map provided by the receiver apparatus 1706 in response to a channel estimation process.

A modulation module 1724 performs the modulation of the resulting set of N complex numbers (some of which may be zero for unused carriers) determined by the mapping module 1722 onto N orthogonal carrier waveforms having peak frequencies $f_1, \ldots, f_N$. The modulation module 1724 performs an inverse discrete Fourier transform (IDFT) to form a discrete time symbol waveform. In one example, the data from the mapping module 1722 is modulated onto subcarrier waveforms using an 8192-point inverse fast Fourier transform (IFFT), resulting in 8192 time samples which make up part of an OFDM symbol. The resulting time samples are in the time domain, while the input to the IDFT is in the frequency domain.

A post-processing module 1726 may combine a sequence of consecutive (potentially overlapping) symbols into a "symbol set" that can be transmitted as a continuous block over the communications medium 1704. The post-processing module 1726 may prepend a preamble to the symbol set that can be used for automatic gain control (AGC) and symbol timing synchronization. In accordance with aspects of this disclosure, the post-processing module 1726 may prepend a custom preamble (rather than a standard preamble) when a countermeasure is activated in association with a denial of service attack. An Analog Front End (AFE) module 1728 couples an analog signal containing a continuous-time (such as low-pass filtered) version of the symbol set to the communications medium 1704. Together, the encoder module 1720, mapping module 1722, modulation module 1724, post-processing module 1726 and AFE module 1728 may be referred to as a TX chain of a transmitter. A PHY controller (not shown) may configure and manage various components of the transmitter, including those shown in the transmitter apparatus 1702.

At the receiver apparatus 1706, modules implementing the PHY layer may receive a signal from the communications medium 1704 and generate a received MPDU for the MAC layer (not shown). An AFE module 1730 may receive a received signal having the symbol set and send the received signal to a demodulation module 1736. The demodulation module 1736 may generate sampled signal data. The demodulation module 1736 may also include a discrete Fourier transform (DFT) feature to translate the sampled received waveform into frequency domain data in the form of complex numbers. For example, in an OFDM system, demodulation may involve a fast Fourier transform (FFT). In single carrier systems, demodulation may involve a constellation demapping to convert the symbol to hard or soft bits.

The decoder module 1738 may map the complex numbers onto the corresponding bit sequences and performs the appropriate decoding of the bits (including de-interleaving and descrambling). Together, the AFE module 1730, demodulation module 1736 and decoder module 1738 may be referred to as an RX chain of a receiver. The RX chain may include other components (not shown), such as an equalizer, filters, automatic gain control, etc. A PHY controller (not shown) may manage and control the components of the receiver.

In accordance with aspects of this disclosure, the receiver apparatus 1706 may include a filter 1732 in association with the AFE module 1730. In some aspects, when a countermeasure is activated, the filter 1732 may be capable of filtering transmissions that begin with a standard preamble. For example, when a node detects a denial of service attack, the node may generate correlation data associated with the denial of service attack. The correlation data may be associated with amplitude, phase, signal strength, or any combination thereof, of at least a standard preamble included in the one or more transmissions. The node may configure the filter 1732 to disregard subsequent transmissions that include the standard preamble matching the correlation data.

Figure 18:
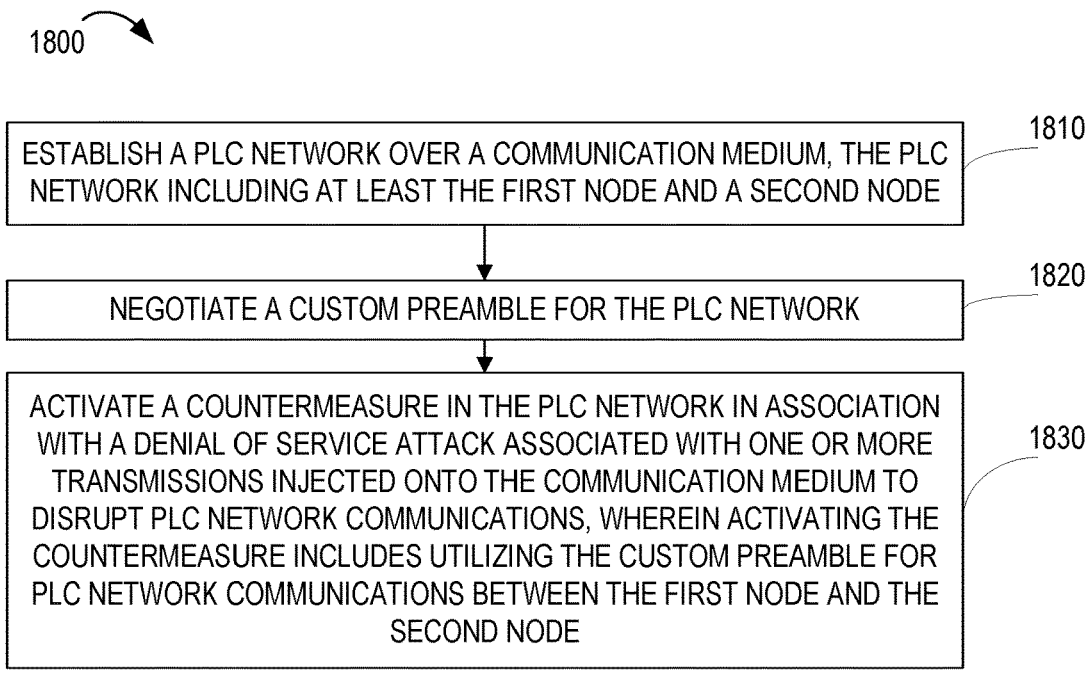
FIG. 18 shows a flowchart illustrating an example process for mitigating a denial of service attack.

FIG. 18 shows a flowchart illustrating an example process 1800 for mitigating a denial of service attack. The operations of the process 1800 may be implemented by a node of a PLC network, or any component thereof as described herein. In some implementations, the process 1800 (or portions thereof) may be performed by a communication unit of a node, such the communication unit 114 or communication unit 124 described with reference to FIG. 1. In some implementations, the process 1800 may be performed by a node or a component thereof, such as the first node 110, the second node 120, or the central node 150 described with reference to any of FIG. 1, 3, 4, 10, 11, 13, 14, or 17, respectively. In some implementations, the process 1800 may be performed by an apparatus or a component thereof, such as the apparatus 2000 described with reference to FIG. 20. For brevity, the example process 1800 is described as being performed by a first node that could be any of the above indicated nodes, communication units, or apparatuses, or a component thereof.

At block 1810, the first node may establish a PLC network over a communication medium, the PLC network including at least the first node and a second node. At block 1820, the first node may negotiate a custom preamble for the PLC network. At block 1830, the first node may activate a countermeasure in the PLC network in association with a denial of service attack associated with one or more transmissions injected onto the communication medium to disrupt PLC network communications, where activating the countermeasure includes utilizing the custom preamble for PLC network communications between the first node and the second node.

Figure 19:
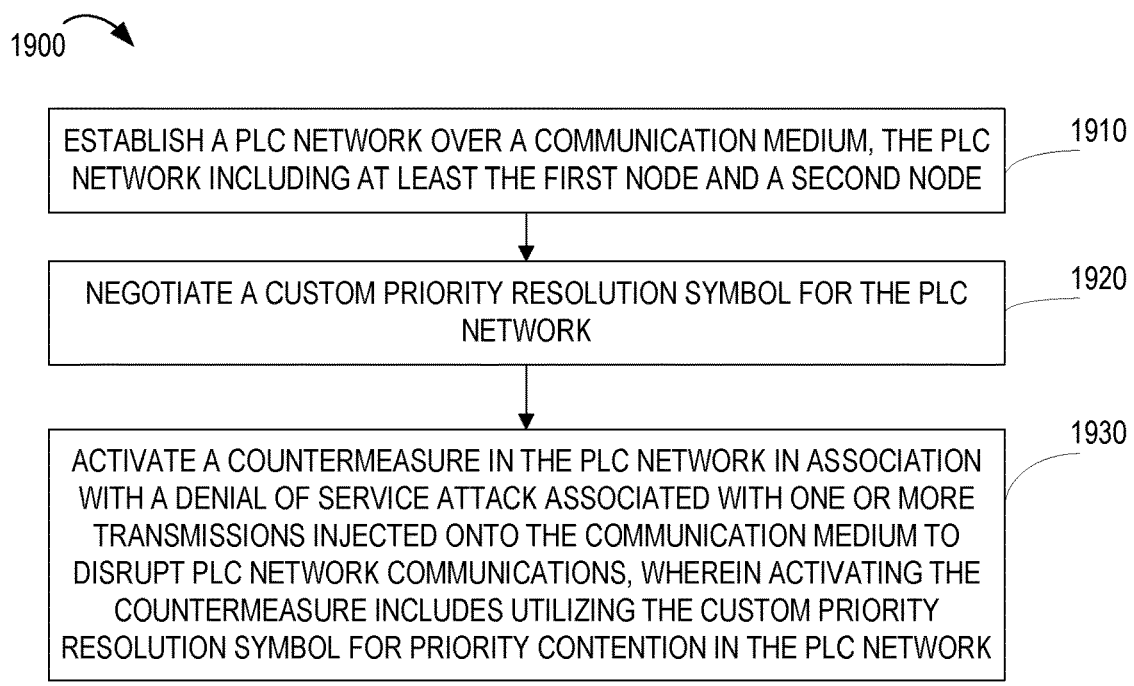
FIG. 19 shows a flowchart illustrating another example process for mitigating a denial of service attack.

FIG. 19 shows a flowchart illustrating another example process for mitigating a denial of service attack. The operations of the process 1900 may be implemented by a node of a PLC network, or any component thereof as described herein. In some implementations, the process 1900 (or portions thereof) may be performed by a communication unit of a node, such the communication unit 114 or communication unit 124 described with reference to FIG. 1. In some implementations, the process 1900 may be performed by a node or a component thereof, such as the first node 110, the second node 120, or the central node 150 described with reference to any of FIG. 1, 3, 4, 10, 11, 13, 14, or 17, respectively. In some implementations, the process 1900 may be performed by an apparatus or a component thereof, such as the apparatus 2000 described with reference to FIG. 20. For brevity, the example process 1900 is described as being performed by a first node that could be any of the above indicated nodes, communication units, or apparatuses, or a component thereof.

At block 1910, the first node may establish a PLC network over a communication medium, the PLC network including at least the first node and a second node. At block 1920, the first node may negotiate a custom priority resolution symbol for the PLC network. At block 1930, the apparatus may activate a countermeasure in the PLC network in association with a denial of service attack associated with one or more transmissions injected onto the communication medium to disrupt PLC network communications, where activating the countermeasure includes utilizing the custom priority resolution symbol for priority contention in the PLC network.

Figure 20:
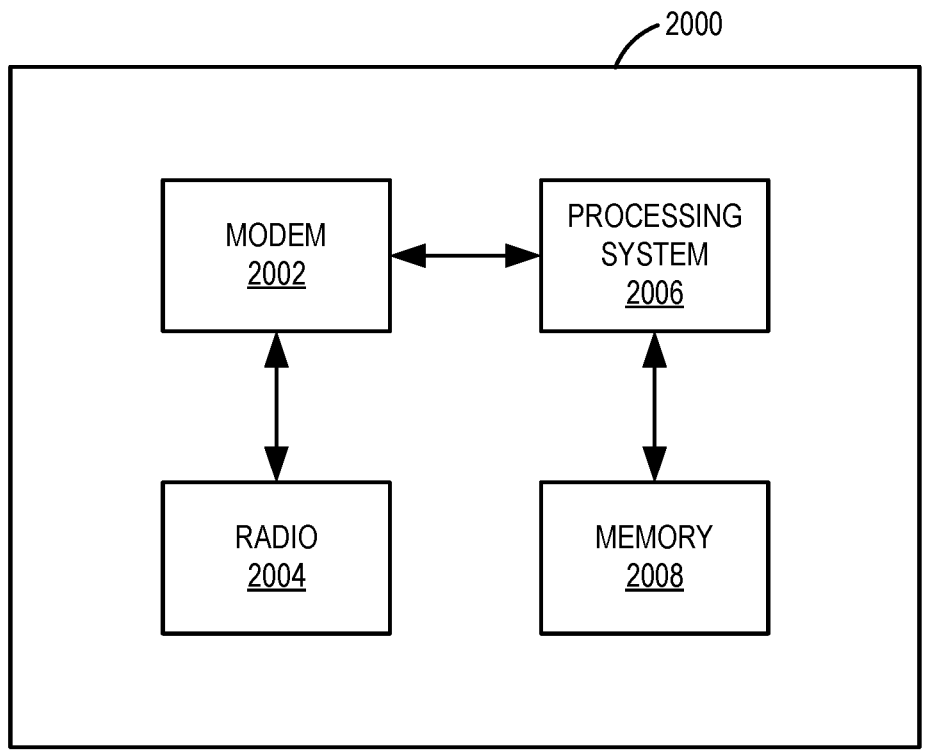
FIG. 20 shows a block diagram of an example apparatus that supports a countermeasure associated with a denial of service attack according to some implementations.

FIG. 20 shows a block diagram of an example apparatus 2000 that supports a countermeasure associated with a denial of service attack according to some implementations. The apparatus 2000 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The apparatus 2000 may include one or more modems 2002. In some implementations, the one or more modems 2002 (collectively "the modem 2002") may include a. For example, the modem 2002 may implement either or both of the transmitter apparatus 1702 and the receiver apparatus 1706 described with reference to FIG. 17. In some implementations, the apparatus 2000 also includes one or more radios (collectively "the radio 2004"). In some implementations, the apparatus 2000 further includes one or more processors, processing blocks or processing elements (collectively "the processing system 2006") and one or more memory blocks or elements (collectively "the memory 2008"). In some implementations, the processing system 2006 can include the memory 2008.

The modem 2002 can include an intelligent hardware block or device such as, for example, an application-specific integrated circuit (ASIC) among other possibilities. The modem 2002 is generally configured to implement a PHY layer. For example, the modem 2002 is configured to modulate packets and to output the modulated packets to the radio 2004 for transmission over the communication medium. The modem 2002 is similarly configured to obtain modulated packets received by the radio 2004 and to demodulate the packets to provide demodulated packets. In addition to a modulator and a demodulator, the modem 2002 may further include digital signal processing (DSP) circuitry, automatic gain control (AGC), a coder, a decoder, a multiplexer and a demultiplexer. For example, while in a transmission mode, data obtained from the processing system 2006 is provided to a coder, which encodes the data to provide encoded bits. The encoded bits are mapped to points in a modulation constellation (using a selected MCS) to provide modulated symbols. The modulated symbols may be mapped to a number NS S of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 2004. In implementations involving beamforming, the modulated symbols in the respective spatial streams are precoded via a steering matrix prior to their provision to the IFFT block.

While in a reception mode, digital signals received from the radio 2004 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processing system 2006) for processing, evaluation, or interpretation.

The radio 2004 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to a wired or wireless communication medium. The symbols output from the modem 2002 are provided to the radio 2004, which transmits the symbols via the coupled communication medium. Similarly, symbols received via the communication medium are obtained by the radio 2004, which provides the symbols to the modem 2002.

The processing system 2006 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processing system 2006 processes information received through the radio 2004 and the modem 2002, and processes information to be output through the modem 2002 and the radio 2004 for transmission through the communication medium. In some implementations, the processing system 2006 may generally control the modem 2002 to cause the modem to perform various operations described above.

The memory 2008 can include tangible storage media such as random-access memory (RAM) or read-only memory (ROM), or combinations thereof. The memory 2008 also can store non-transitory processor- or computer-executable software (SW) code containing instructions that, when executed by the processing system 2006, cause the processor to perform various operations described herein for PLC network communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 21:
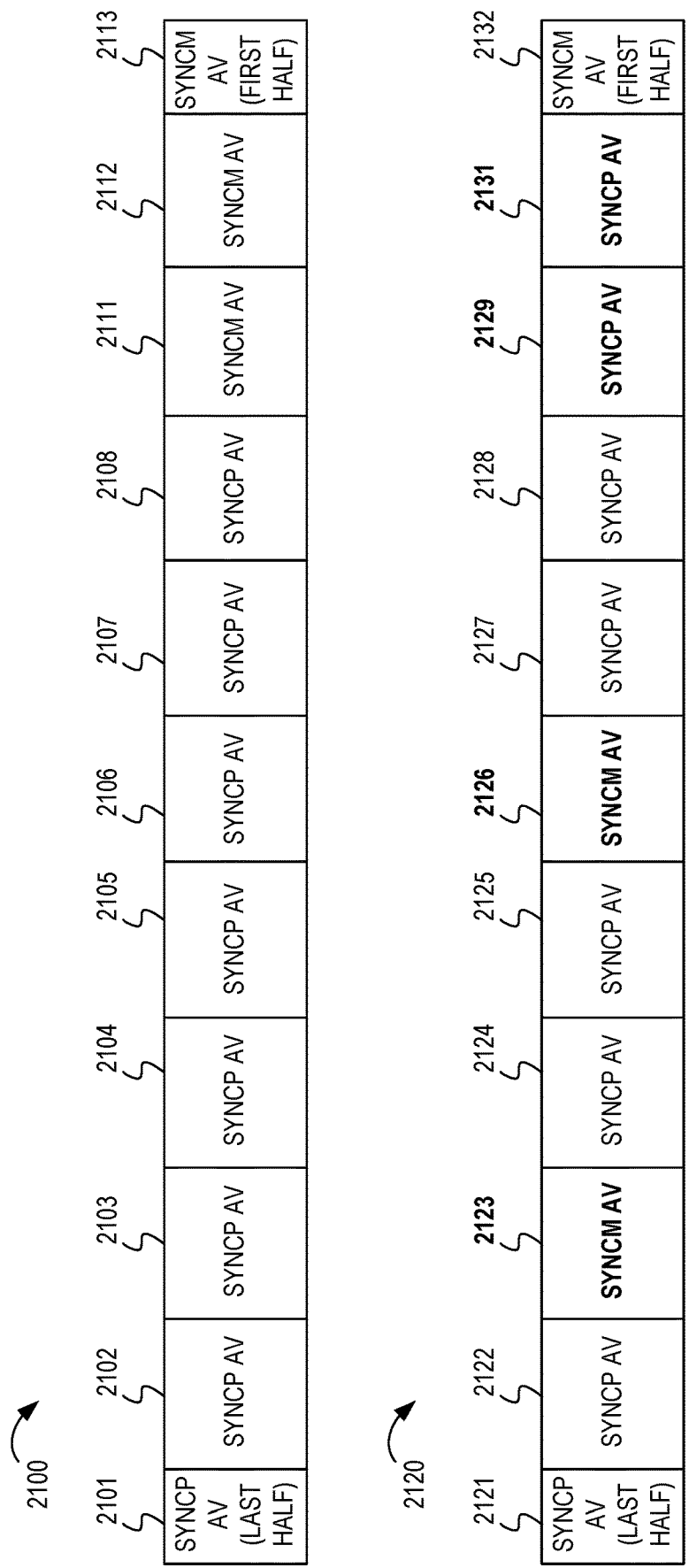
FIG. 21 shows an example custom preamble in comparison to a standard preamble.

FIG. 21 shows an example custom preamble 2120 in comparison to a standard preamble 2100. The standard preamble 2100 may include a combination of synchronization symbols. A first type of synchronization symbol is denoted as a "SYNCP AV" symbol and a second type of synchronization symbol is denoted as a "SYNCM AV" symbol. The SYNCP AV and SYNCM AV symbols (such as the frequencies and phase angle of each carrier in the synchronization symbol) may be specified in a standard specification. In some implementations, the synchronization symbols utilize carriers spanning 1.8-30 MHz. The symbols labeled "Last Half" and "First Half" span 192 samples or 2.56 us whereas the other symbols span 384 samples or 5.12 us. The standard specification may define the order and structure of the standard preamble 2100 to include (in this order):
 a partial SYNCP AV symbol (last half) 2101,
 seven (7) SYNCP AV symbols 2102, 2013, 2014, 2015, 2016, 2017, and 2018,
 two (2) SYNCM AV symbols 2111 and 2113, and
 a partial SYNCM AV symbol (first half) 2113.
Also shown in FIG. 21 is an example custom preamble 2120. In some implementations, the example custom preamble 2120 may include the same types of SYNCP AV and SYNCM AV symbols as defined for the standard preamble 2100, albeit in a different order. For example, the example custom preamble 2120 may include (in this order):
 a partial SYNCP AV symbol (last half) 2121,
 a SYNCP AV symbol 2122,
 a SYNCM AV symbol 2123,
 two (2) SYNCP AV symbols 2124 and 2125,
 a SYNCM AV symbol 2126,
 four (4) SYNCP AV symbols 2127, 2128, 2129 and 2131, and
 a partial SYNCM AV symbol (first half) 2113.
For comparison purposes, the differences in the example custom preamble 2120 in comparison to the standard preamble 2100 are shown in bold.

The example custom preamble 2120 is provided for illustrative purposes. In practice, a custom preamble may take any arrangement of SYNCP AV, SYNCP AV, or other synchronization symbols.

FIG. 22 shows a partial frequency/phase configuration 2210 of an example custom preamble symbol in comparison to the partial frequency/phase configuration 2200 of a standard preamble symbol. A standard specification may define the frequencies and phase angle of each carrier in a preamble symbol. The partial frequency/phase configuration 2200 shows a partial listing of carriers, frequencies, and phase angles associated with a standard SYNCP AV symbol (such as those described with reference to FIG. 21) for use in the standard preamble. The actual phase, in radians, is the Phase Angle Number multiplied by $\pi/8$. The SYNCM AV time domain waveform may be defined as the SYNCP AV waveform multiplied by $-1$ and the SYNCM AV phases are the SYNCP AV phases shifted by 7E radians.

The partial frequency/phase configuration 2210 of the example custom preamble symbol may use different values for frequencies or phase angles compared to the partial frequency/phase configuration 2200 of a standard preamble symbol. For example, carriers 10 and 14 of the custom preamble symbol may use different frequencies compared to carriers 10 and 14, respectively, of the standard preamble symbol. As another example, carriers 12 and 13 of the custom preamble symbol may use different phase angles compared to carrier 12 and 13, respectively, of the standard preamble symbol. For comparison purposes, the differences in the example custom preamble symbol 2210 in comparison to the standard preamble symbol 2200 are shown in bold.

The example custom preamble symbol 2210 is provided for illustrative purposes. In practice, a custom preamble symbol may different frequencies, phase angles, or both, associated with one or more tones in comparison to the standard preamble symbol.

The examples of FIGS. 21 and 22 are described in relation to a standard preamble and example custom preamble, although the examples also may apply to priority resolution symbols. The standard specification may define the symbol structure for a standard priority resolution symbol based on frequencies and phase angles for various carriers. An example custom priority resolution symbol may include differences (such as frequencies, phase angles, or both) to one or more carriers in comparison to the standard priority resolution symbol.

This disclosure includes example messages that can be used to negotiate a custom preamble or a custom priority resolution slot, such as an application layer message, an MME message, a MAC frame, or a message associated with a SLAC protocol, among other examples. In some implementations, a message may include a field indicating an order of SYNCM or SYNCP symbols associated with a custom preamble. In some implementations, a message may include a field indicating the frequency/phase configuration of a SYNCM or SYNCP symbol. In some implementations, a message may include a field formatted to indicate changes to the standard preamble, such that the custom preamble can be derived from the standard preamble and the indicated changes. In some implementations, a message may carry a value indicating one of a plurality of custom preambles. For example, the value may correspond to an entry in a lookup table that includes predefined values associated with corresponding predefined custom preambles. In some implementations, information about a custom preamble may be communicated in a compressed format such that the first and second node can derive the custom preamble from the information.

FIGS. 1-22 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (enumerated as clauses for clarity).

Clause 1. A method of a first node in a power line communication (PLC) network, including: establishing a PLC network over a communication medium, the PLC network including at least the first node and a second node; negotiating a custom preamble for the PLC network; and activating a countermeasure in the PLC network in association with a denial of service attack associated with one or more transmissions injected onto the communication medium to disrupt PLC network communications, where activating the countermeasure includes utilizing the custom preamble for PLC network communications between the first node and the second node.

Clause 2. The method of clause 1, further including: processing at least a first transmission of the one or more transmissions in association with a PLC frame format of a PLC standard specification; and activating the countermeasure when the first transmission includes a first portion that conforms to the PLC standard specification and a second portion that contradicts the PLC standard specification.

Clause 3. The method of any one of clauses 1-2, further including: attempting to process the one or more transmissions in association with a PLC frame format of a PLC standard specification, where the PLC frame format includes at least a preamble portion, a frame control (FC) portion and a payload portion; counting a quantity of error conditions associated with failures to process the preamble portion, the FC portion, the payload portion, or any combination thereof; and activating the countermeasure when the quantity of error conditions is above a processing error threshold.

Clause 4. The method of clause 3, where the failures to process the preamble portion, the FC portion, the payload portion, or any combination thereof, include a failure to process a first transmission in association with at least one error condition selected from a group consisting of: the preamble portion of the first transmission being invalid or incomplete; the FC portion of the first transmission being invalid or omitted; a cyclic redundancy check (CRC) error associated with the FC portion of the first transmission; the FC portion of the first transmission including an invalid Beacon Time Stamp (BTS) delimiter; the FC portion of the first transmission including an invalid value for a Management media access control (MAC) Frame Stream Command field or a Management MAC Frame Stream Response field; the payload portion of the first transmission being invalid or omitted; the first transmission ending before expiration of a Virtual Carrier Sense (VCS) timer that would otherwise normally be associated with an ending of a valid PLC frame; and the first transmission being identical to a previous transmission of the one or more transmissions.

Clause 5. The method of any one of clauses 1-4, where the one or more transmissions include a plurality of transmissions, the method further including: attempting to process the plurality of transmissions in association with a PLC frame format of a PLC standard specification; counting a quantity of cyclic redundancy check (CRC) errors associated with the plurality of transmissions; and activating the countermeasure when the quantity of CRC errors is above a CRC error threshold.

Clause 6. The method of any one of clauses 1-5, further including: attempting to process a first transmission of the one or more transmissions in association with a PLC frame format of a PLC standard specification; and activating the countermeasure when the first transmission includes an invalid value in a frame control (FC) portion the first transmission.

Clause 7. The method of clause 6, where the invalid value includes a first Beacon Time Stamp (BTS) value in the first transmission that is inconsistent with an expected BTS value, the expected BTS value associated with one or more previous BTS values of one or more corresponding previous transmissions and amounts of time between the one or more corresponding previous transmissions.

Clause 8. The method of any one of clauses 1-7, further including: receiving a current media access control (MAC) frame stream state indicated in a frame control (FC) portion of a current transmission of the one or more transmissions; and activating the countermeasure when the current MAC frame stream state is inconsistent with an expected MAC frame stream state, where the expected MAC frame stream state derived from a preceding MAC frame stream state of a preceding transmission of the one or more transmissions.

Clause 9. The method of clause 8, where the preceding MAC frame stream state is a Management MAC Frame Stream Command or a Management MAC Frame Stream Response, and the expected MAC frame stream state is the other one of the Management MAC Frame Stream Command or the Management MAC Frame Stream Response.

Clause 10. The method of any one of clauses 1-9, further including: periodically assessing a busy condition of the communication medium in association with a carrier-sense multiple access (CSMA) mechanism; counting a quantity of busy conditions over a time period; and activating the countermeasure when the quantity of busy conditions is above a busyness threshold.

Clause 11. The method of any one of clauses 1-10, where the PLC network is associated with a PLC standard specification that defines operations of the PLC network, where the PLC standard specification includes a standard carrier-sense multiple access (CSMA) mechanism in which the first node or the second node refrain from communicating via the communication medium during a backoff period after observing a communication having a standard preamble, the method further including: utilizing a custom CSMA mechanism associated with a modification of the standard CSMA mechanism, where the custom CSMA mechanism includes monitoring for the custom preamble rather than the standard preamble.

Clause 12. The method of any one of clauses 1-11, where activating the countermeasure includes overriding a carrier-sense multiple access (CSMA) mechanism of the PLC network when an override condition is satisfied in association with the denial of service attack.

Clause 13. The method of clause 12, where the override condition is satisfied when a signal strength metric of the one or more transmissions is below a signal strength threshold, and where the signal strength threshold is associated with any combination of: a threshold associated with the signal strength metric, a dynamic threshold associated with a quantity of authenticated nodes in the PLC network, a reference signal strength associated with previous communications between the first node and the second node, a fixed offset value associated with the reference signal strength, or a dynamic offset value associated with a quantity of CSMA collisions on the communication medium.

Clause 14. The method of any one of clauses 12-13, where the CSMA mechanism includes the first node normally refraining from communicating via the communication medium during a backoff period after observing a communication having a PLC frame format of a PLC standard specification, and where the override condition is satisfied when the first node has refrained from communicating during a plurality of consecutive backoff periods that exceeds a maximum time or when the plurality of consecutive backoff periods reaches a maximum quantity.

Clause 15. The method of any one of clauses 1-14, where the custom preamble is different from a standard preamble of a PLC standard specification such that the custom preamble is known to the first node and the second node but not known to an attacking node associated with the denial of service attack, and where activating the countermeasure includes: adapting a carrier-sense multiple access (CSMA) mechanism of the first node to monitor for the custom preamble rather than the standard preamble.

Clause 16. The method of any one of clauses 1-15, where activating the countermeasure further includes: communicating a preamble change indication to the second node to inform the second node that the first node will use the custom preamble for the PLC network communications.

Clause 17. The method of clause 16, where communicating the preamble change indication includes communicating the preamble change indication in a management message entry (MME) frame or an application layer protocol message.

Clause 18. The method of clause 16, where communicating the preamble change indication includes transmitting a pulse width modulation (PWM) signal having a predetermined duty cycle or sequence associated with the preamble change indication.

Clause 19. The method of any one of clauses 1-18, where activating the countermeasure includes: communicating a preamble change indication to a central node of the PLC network to cause the central node to instruct one or more other nodes of one or more respective PLC networks to utilize use the custom preamble.

Clause 20. The method of any one of clauses 1-19, where activating the countermeasure includes: receiving a preamble change indication from the second node or a central node in association with the denial of service attack, where the preamble change indication is indicative that the second node or the central node will use the custom preamble for the PLC network communications from the second node.

Clause 21. The method of any one of clauses 1-20, where activating the countermeasure includes: generating correlation data associated with the denial of service attack, the correlation data associated with amplitude, phase, signal strength, or any combination thereof, of at least a standard preamble included in the one or more transmissions; and adjusting a physical (PHY) layer of the first node to disregard subsequent transmissions of the one or more transmissions that include the standard preamble matching the correlation data.

Clause 22. The method of any one of clauses 1-21, where negotiating the custom preamble includes communicating the custom preamble in a management message entry (MME) frame or an application layer protocol message.

Clause 23. A first node for use in a power line communication (PLC) network, including: a communication unit configured to establish a PLC network over a communication medium, the PLC network including at least the first node and a second node; and a processor communicatively coupled to the communication unit, the processor configured to: negotiate a custom preamble for the PLC network, and activate a countermeasure in the PLC network in association with a denial of service attack associated with one or more transmissions injected onto the communication medium to disrupt PLC network communications, where the communication unit is configured to utilize the custom preamble for PLC network communications between the first node and the second node when the countermeasure is activated.

Clause 24. The first node of clause 23, where the processor is further configured to: process at least a first transmission of the one or more transmissions in association with a PLC frame format of a PLC standard specification; and activate the countermeasure when the first transmission includes a first portion that conforms to the PLC standard specification and a second portion that contradicts the PLC standard specification.

Clause 25. The first node of any one of clauses 23-24, where the processor is further configured to: attempt to process the one or more transmissions in association with a PLC frame format of a PLC standard specification, where the PLC frame format includes at least a preamble portion, a frame control (FC) portion and a payload portion; count a quantity of error conditions associated with failures to process the preamble portion, the FC portion, the payload portion, or any combination thereof; and activate the countermeasure when the quantity of error conditions is above a processing error threshold.

Clause 26. The first node of clause 25, where the failures to process the preamble portion, the FC portion, the payload portion, or any combination thereof, include a failure to process a first transmission in association with at least one error condition selected from a group consisting of: the preamble portion of the first transmission being invalid or incomplete the FC portion of the first transmission being invalid or omitted a cyclic redundancy check (CRC) error associated with the FC portion of the first transmission the FC portion of the first transmission including an invalid Beacon Time Stamp (BTS) delimiter the FC portion of the first transmission including an invalid value for a Management media access control (MAC) Frame Stream Command field or a Management MAC Frame Stream Response field the payload portion of the first transmission being invalid or omitted the first transmission ending before expiration of a Virtual Carrier Sense (VCS) timer that would otherwise normally be associated with an ending of a valid PLC frame; and the first transmission being identical to a previous transmission of the one or more transmissions.

Clause 27. The first node of any one of clauses 23-26, where the processor is further configured to override a carrier-sense multiple access (CSMA) mechanism of the PLC network when an override condition is satisfied in association with the denial of service attack.

Clause 28. The first node of clause 27, where the override condition is satisfied when a signal strength metric of the one or more transmissions is below a signal strength threshold, and where the signal strength threshold is associated with any combination of: a threshold associated with the signal strength metric a dynamic threshold associated with a quantity of authenticated nodes in the PLC network a reference signal strength associated with previous communications between the first node and the second node a fixed offset value associated with the reference signal strength, or a dynamic offset value associated with a quantity of CSMA collisions on the communication medium.

Clause 29. The first node of any one of clauses 27-28, where the CSMA mechanism includes the communication unit normally refraining from communicating via the communication medium during a backoff period after observing a communication having a PLC frame format of a PLC standard specification, and where the override condition is satisfied when the communication unit has refrained from communicating during a plurality of consecutive backoff periods that exceeds a maximum time or when the plurality of consecutive backoff periods reaches a maximum quantity.

Clause 30. The first node of any one of clauses 23-29, where the processor is further configured to: cause the communication unit to communicate a preamble change indication to the second node to inform the second node that the first node will use the custom preamble for the PLC network communications.

Clause 31. The first node of clause 30, where the communication unit is configured to communicate the preamble change indication via at least one member selected from a group consisting of: a management message entry (MME) frame that includes the preamble change indication; an application layer protocol message that includes the preamble change indication; a pulse width modulation (PWM) signal having a predetermined duty cycle or sequence associated with the preamble change indication; and a message that includes the preamble change indication, where the communication unit is configured to communicate the message to a central node of the PLC network to cause the central node to instruct one or more other nodes of one or more respective PLC networks to utilize use the custom preamble.

Clause 32. The first node of any one of clauses 23-31, where the communication unit is configured to: obtain a preamble change indication from the second node or a central node in association with the denial of service attack, where the preamble change indication is indicative that the second node or the central node will use the custom preamble for PLC network communications from the second node.

Clause 33. The first node of any one of clauses 23-32, where the processor is configured to generate correlation data associated with the denial of service attack, the correlation data associated with amplitude, phase, signal strength, or any combination thereof, of at least a standard preamble included in the one or more transmissions; and where the communication unit is configured to disregard subsequent transmissions of the one or more transmissions that include the standard preamble matching the correlation data.

Clause 34. A method of a first node in a power line communication (PLC) network, including: establishing a PLC network over a communication medium, the PLC network including at least the first node and a second node; negotiating a custom priority resolution symbol for the PLC network; and activating a countermeasure in the PLC network in association with a denial of service attack associated with one or more transmissions injected onto the communication medium to disrupt PLC network communications, where activating the countermeasure includes utilizing the custom priority resolution symbol for priority contention in the PLC network.

Clause 35. The method of clause 34, where activating the countermeasure includes disregarding one or more standard priority resolution symbols associated with a PLC standard specification.

Clause 36. The method of clause 34, where the PLC network is associated with a PLC standard specification that defines operations of the PLC network, where the PLC standard specification includes a standard priority contention mechanism in which the first node or the second node signal their respective priorities using a standard priority resolution symbol during priority resolution slots (PRSs), and where the method further includes utilizing a custom priority contention mechanism associated with a modification of the standard priority contention mechanism, where the custom priority contention mechanism includes monitoring for the custom priority resolution symbol rather than the standard priority resolution symbol.

Clause 37. The method of clause 34, where the custom priority resolution symbol is different from a standard priority resolution symbol of a PLC standard specification such that the custom priority resolution symbol is known to the first node and the second node but not known to an attacking node associated with the denial of service attack, and where activating the countermeasure includes adapting a priority contention mechanism of the first node to monitor for the custom priority resolution symbol rather than the standard priority resolution symbol.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of a first node in a power line communication (PLC) network, comprising:
    establishing a PLC network over a communication medium, the PLC network including at least the first node and a second node;
    negotiating a custom preamble for the PLC network; and
    activating a countermeasure in the PLC network in association with a denial of service attack associated with one or more transmissions injected onto the communication medium to disrupt PLC network communications, wherein activating the countermeasure includes utilizing the custom preamble for PLC network communications between the first node and the second node.

2. The method of claim 1, further comprising:
    processing at least a first transmission of the one or more transmissions in association with a PLC frame format of a PLC standard specification; and
    activating the countermeasure when the first transmission includes a first portion that conforms to the PLC standard specification and a second portion that contradicts the PLC standard specification.

3. The method of claim 1, further comprising:
    attempting to process the one or more transmissions in association with a PLC frame format of a PLC standard specification, wherein the PLC frame format includes at least a preamble portion, a frame control (FC) portion and a payload portion;
    counting a quantity of error conditions associated with failures to process the preamble portion, the FC portion, the payload portion, or any combination thereof; and
    activating the countermeasure when the quantity of error conditions is above a processing error threshold.

4. The method of claim 3, wherein the failures to process the preamble portion, the FC portion, the payload portion, or any combination thereof, include a failure to process a first transmission in association with at least one error condition selected from a group consisting of:
    the preamble portion of the first transmission being invalid or incomplete;
    the FC portion of the first transmission being invalid or omitted;
    a cyclic redundancy check (CRC) error associated with the FC portion of the first transmission;
    the FC portion of the first transmission including an invalid Beacon Time Stamp (BTS) delimiter;
    the FC portion of the first transmission including an invalid value for a Management media access control (MAC) Frame Stream Command field or a Management MAC Frame Stream Response field;
the payload portion of the first transmission being invalid or omitted;
the first transmission ending before expiration of a Virtual Carrier Sense (VCS) timer that would otherwise normally be associated with an ending of a valid PLC frame; and
the first transmission being identical to a previous transmission of the one or more transmissions.

5. The method of claim 1, wherein the one or more transmissions include a plurality of transmissions, the method further comprising:
attempting to process the plurality of transmissions in association with a PLC frame format of a PLC standard specification;
counting a quantity of cyclic redundancy check (CRC) errors associated with the plurality of transmissions; and
activating the countermeasure when the quantity of CRC errors is above a CRC error threshold.

6. The method of claim 1, further comprising:
attempting to process a first transmission of the one or more transmissions in association with a PLC frame format of a PLC standard specification; and
activating the countermeasure when the first transmission includes an invalid value in a frame control (FC) portion the first transmission.

7. The method of claim 6, wherein the invalid value includes a first Beacon Time Stamp (BTS) value in the first transmission that is inconsistent with an expected BTS value, the expected BTS value associated with one or more previous BTS values of one or more corresponding previous transmissions and amounts of time between the one or more corresponding previous transmissions.

8. The method of claim 1, further comprising:
receiving a current media access control (MAC) frame stream state indicated in a frame control (FC) portion of a current transmission of the one or more transmissions; and
activating the countermeasure when the current MAC frame stream state is inconsistent with an expected MAC frame stream state, wherein the expected MAC frame stream state derived from a preceding MAC frame stream state of a preceding transmission of the one or more transmissions.

9. The method of claim 8, wherein the preceding MAC frame stream state is a Management MAC Frame Stream Command or a Management MAC Frame Stream Response, and the expected MAC frame stream state is the other one of the Management MAC Frame Stream Command or the Management MAC Frame Stream Response.

10. The method of claim 1, further comprising:
periodically assessing a busy condition of the communication medium in association with a carrier-sense multiple access (CSMA) mechanism;
counting a quantity of busy conditions over a time period; and
activating the countermeasure when the quantity of busy conditions is above a busyness threshold.

11. The method of claim 1,
wherein the PLC network is associated with a PLC standard specification that defines operations of the PLC network,
wherein the PLC standard specification includes a standard carrier-sense multiple access (CSMA) mechanism in which the first node or the second node refrain from communicating via the communication medium during a backoff period after observing a communication having a standard preamble, the method further comprising:
utilizing a custom CSMA mechanism associated with a modification of the standard CSMA mechanism, wherein the custom CSMA mechanism includes monitoring for the custom preamble rather than the standard preamble.

12. The method of claim 1, wherein activating the countermeasure includes overriding a carrier-sense multiple access (CSMA) mechanism of the PLC network when an override condition is satisfied in association with the denial of service attack.

13. The method of claim 12, wherein the override condition is satisfied when a signal strength metric of the one or more transmissions is below a signal strength threshold, and wherein the signal strength threshold is associated with any combination of:
a threshold associated with the signal strength metric,
a dynamic threshold associated with a quantity of authenticated nodes in the PLC network,
a reference signal strength associated with previous communications between the first node and the second node,
a fixed offset value associated with the reference signal strength, or
a dynamic offset value associated with a quantity of CSMA collisions on the communication medium.

14. The method of claim 12, wherein the CSMA mechanism includes the first node normally refraining from communicating via the communication medium during a backoff period after observing a communication having a PLC frame format of a PLC standard specification, and wherein the override condition is satisfied when the first node has refrained from communicating during a plurality of consecutive backoff periods that exceeds a maximum time or when the plurality of consecutive backoff periods reaches a maximum quantity.

15. The method of claim 1, wherein the custom preamble is different from a standard preamble of a PLC standard specification such that the custom preamble is known to the first node and the second node but not known to an attacking node associated with the denial of service attack, and wherein activating the countermeasure includes:
adapting a carrier-sense multiple access (CSMA) mechanism of the first node to monitor for the custom preamble rather than the standard preamble.

16. The method of claim 1, wherein activating the countermeasure further includes:
communicating a preamble change indication to the second node to inform the second node that the first node will use the custom preamble for the PLC network communications.

17. The method of claim 16, wherein communicating the preamble change indication includes communicating the preamble change indication in a management message entry (MME) frame or an application layer protocol message.

18. The method of claim 16, wherein communicating the preamble change indication includes transmitting a pulse width modulation (PWM) signal having a predetermined duty cycle or sequence associated with the preamble change indication.

19. The method of claim 1, wherein activating the countermeasure includes:
communicating a preamble change indication to a central node of the PLC network to cause the central node.

20. The method of claim 1, wherein activating the countermeasure includes:
receiving a preamble change indication from the second node or a central node in association with the denial of service attack, wherein the preamble change indication is indicative that the second node or the central node will use the custom preamble for the PLC network communications from the second node.

21. The method of claim 1, wherein activating the countermeasure includes:
generating correlation data associated with the denial of service attack, the correlation data associated with amplitude, phase, signal strength, or any combination thereof, of at least a standard preamble included in the one or more transmissions; and
adjusting a physical (PHY) layer of the first node to disregard subsequent transmissions of the one or more transmissions that include the standard preamble matching the correlation data.

22. The method of claim 1, wherein negotiating the custom preamble includes communicating the custom preamble in an encrypted message, a management message entry (MME) frame or an application layer protocol message.

23. A first node for use in a power line communication (PLC) network, comprising:
a communication unit configured to establish a PLC network over a communication medium, the PLC network including at least the first node and a second node; and
a processor communicatively coupled to the communication unit, the processor configured to:
negotiate a custom preamble for the PLC network, and
activate a countermeasure in the PLC network in association with a denial of service attack associated with one or more transmissions injected onto the communication medium to disrupt PLC network communications,
wherein the communication unit is configured to utilize the custom preamble for PLC network communications between the first node and the second node when the countermeasure is activated.

24. The first node of claim 23, wherein the processor is further configured to:
process at least a first transmission of the one or more transmissions in association with a PLC frame format of a PLC standard specification; and
activate the countermeasure when the first transmission includes a first portion that conforms to the PLC standard specification and a second portion that contradicts the PLC standard specification.

25. The first node of claim 23, wherein the processor is further configured to:
attempt to process the one or more transmissions in association with a PLC frame format of a PLC standard specification, wherein the PLC frame format includes at least a preamble portion, a frame control (FC) portion and a payload portion;
count a quantity of error conditions associated with failures to process the preamble portion, the FC portion, the payload portion, or any combination thereof; and
activate the countermeasure when the quantity of error conditions is above a processing error threshold.

26. The first node of claim 25, wherein the failures to process the preamble portion, the FC portion, the payload portion, or any combination thereof, include a failure to process a first transmission in association with at least one error condition selected from a group consisting of:
the preamble portion of the first transmission being invalid or incomplete
the FC portion of the first transmission being invalid or omitted
a cyclic redundancy check (CRC) error associated with the FC portion of the first transmission
the FC portion of the first transmission including an invalid Beacon Time Stamp (BTS) delimiter
the FC portion of the first transmission including an invalid value for a Management media access control (MAC) Frame Stream Command field or a Management MAC Frame Stream Response field
the payload portion of the first transmission being invalid or omitted
the first transmission ending before expiration of a Virtual Carrier Sense (VCS) timer that would otherwise normally be associated with an ending of a valid PLC frame; and
the first transmission being identical to a previous transmission of the one or more transmissions.

27. The first node of claim 23, wherein the processor is further configured to override a carrier-sense multiple access (CSMA) mechanism of the PLC network when an override condition is satisfied in association with the denial of service attack.

28. The first node of claim 27, wherein the override condition is satisfied when a signal strength metric of the one or more transmissions is below a signal strength threshold, and wherein the signal strength threshold is associated with any combination of:
a threshold associated with the signal strength metric
a dynamic threshold associated with a quantity of authenticated nodes in the PLC network
a reference signal strength associated with previous communications between the first node and the second node
a fixed offset value associated with the reference signal strength, or
a dynamic offset value associated with a quantity of CSMA collisions on the communication medium.

29. The first node of claim 27, wherein the CSMA mechanism includes the communication unit normally refraining from communicating via the communication medium during a backoff period after observing a communication having a PLC frame format of a PLC standard specification, and wherein the override condition is satisfied when the communication unit has refrained from communicating during a plurality of consecutive backoff periods that exceeds a maximum time or when the plurality of consecutive backoff periods reaches a maximum quantity.

30. The first node of claim 23, wherein the processor is further configured to:
cause the communication unit to communicate a preamble change indication to the second node to inform the second node that the first node will use the custom preamble for the PLC network communications.

31. The first node of claim 30, wherein the communication unit is configured to communicate the preamble change indication via at least one member selected from a group consisting of:
a management message entry (MME) frame that includes the preamble change indication;
an application layer protocol message that includes the preamble change indication;

a pulse width modulation (PWM) signal having a predetermined duty cycle or sequence associated with the preamble change indication; and a message that includes the preamble change indication, wherein the communication unit is configured to communicate the message to a central node of the PLC network to cause the central node to instruct one or more other nodes of one or more respective PLC networks to utilize use the custom preamble.

32. The first node of claim 23, wherein the communication unit is configured to:

obtain a preamble change indication from the second node or a central node in association with the denial of service attack, wherein the preamble change indication is indicative that the second node or the central node will use the custom preamble for PLC network communications from the second node.

33. The first node of claim 23, wherein the processor is configured to generate correlation data associated with the denial of service attack, the correlation data associated with amplitude, phase, signal strength, or any combination thereof, of at least a standard preamble included in the one or more transmissions; and wherein the communication unit is configured to disregard subsequent transmissions of the one or more transmissions that include the standard preamble matching the correlation data.

34. A method of a first node in a power line communication (PLC) network, comprising:

establishing a PLC network over a communication medium, the PLC network including at least the first node and a second node;

negotiating a custom priority resolution symbol for the PLC network; and activating a countermeasure in the PLC network in association with a denial of service attack associated with one or more transmissions injected onto the communication medium to disrupt PLC network communications, wherein activating the countermeasure includes utilizing the custom priority resolution symbol for priority contention in the PLC network.

35. The method of claim 34, wherein activating the countermeasure includes disregarding one or more standard priority resolution symbols associated with a PLC standard specification.

36. The method of claim 34, wherein the PLC network is associated with a PLC standard specification that defines operations of the PLC network, wherein the PLC standard specification includes a standard priority contention mechanism in which the first node or the second node signal their respective priorities using a standard priority resolution symbol during priority resolution slots (PRSs), the method further comprising:

utilizing a custom priority contention mechanism associated with a modification of the standard priority contention mechanism, wherein the custom priority contention mechanism includes monitoring for the custom priority resolution symbol rather than the standard priority resolution symbol.

37. The method of claim 34, wherein the custom priority resolution symbol is different from a standard priority resolution symbol of a PLC standard specification such that the custom priority resolution symbol is known to the first node and the second node but not known to an attacking node associated with the denial of service attack, and wherein activating the countermeasure includes:

adapting a priority contention mechanism of the first node to monitor for the custom priority resolution symbol rather than the standard priority resolution symbol.

* * * * *

UNITED STATES PATENT AND TRADEMARK OFFICE
CERTIFICATE OF CORRECTION

PATENT NO. : 12,069,026 B2
APPLICATION NO. : 17/808105
DATED : August 20, 2024
INVENTOR(S) : Subramanian et al.

Page 1 of 1

It is certified that error appears in the above-identified patent and that said Letters Patent is hereby corrected as shown below:

In the Claims

Claim 19, Column 38, Lines 66-67 should read:
"communicating node of the PLC network to cause the central node to instruct one or more other nodes of one or more respective PLC networks to utilize the custom preamble."

Signed and Sealed this
Twenty-first Day of January, 2025

Coke Morgan Stewart
*Acting Director of the United States Patent and Trademark Office*